(12) United States Patent
Alkemper et al.

(10) Patent No.: US 9,930,062 B1
(45) Date of Patent: Mar. 27, 2018

(54) SYSTEMS AND METHODS FOR CYBER SECURITY RISK ASSESSMENT

(71) Applicant: Factory Mutual Insurance Company, Johnston, RI (US)

(72) Inventors: Jens Alkemper, Bellingham, MA (US); Antonio Faria, Johnston, RI (US)

(73) Assignee: Factory Mutual Insurance Company, Johnston, RI (US)

( * ) Notice: Subject to any disclaimer, the term of this patent is extended or adjusted under 35 U.S.C. 154(b) by 0 days.

(21) Appl. No.: 15/633,242

(22) Filed: Jun. 26, 2017

(51) Int. Cl.
 G06F 11/00 (2006.01)
 H04L 29/06 (2006.01)

(52) U.S. Cl.
 CPC .............................. H04L 63/1433 (2013.01)

(58) Field of Classification Search
 CPC ................................................ H04L 63/1433
 See application file for complete search history.

(56) References Cited

U.S. PATENT DOCUMENTS

| | | |
|---|---|---|
| 6,334,192 B1 | 12/2001 | Karpf |
| 6,374,358 B1 | 4/2002 | Townsend |
| 7,234,065 B2 | 6/2007 | Breslin et al. |
| 7,324,905 B2 | 1/2008 | Droubie et al. |
| 7,433,829 B2 | 10/2008 | Borgia et al. |
| 7,467,044 B2 | 12/2008 | Tran et al. |
| 7,613,625 B2 | 11/2009 | Heinrich |
| 7,752,125 B1 | 7/2010 | Kothari et al. |
| 7,809,595 B2 | 10/2010 | Breslin et al. |
| 7,836,008 B2 | 11/2010 | Patton |
| 7,865,383 B2 | 1/2011 | Tafoya |
| 7,900,259 B2 | 3/2011 | Jeschke et al. |
| 7,908,194 B2 | 3/2011 | Hollas |
| 7,930,753 B2 | 4/2011 | Mellinger et al. |

(Continued)

FOREIGN PATENT DOCUMENTS

WO 2012107933 A1 8/2012

OTHER PUBLICATIONS

Schmittling, "Performing a Security Risk Assessment," ISACA Journal, vol. 1, 2010, pp. 1-7.

(Continued)

*Primary Examiner* — Mohammed Waliullah
(74) *Attorney, Agent, or Firm* — Venable LLP; Steven J. Schwarz; George L. Howarah

(57) ABSTRACT

The present invention is directed to methods, systems, and non-transitory computer readable mediums which can evaluate cyber readiness of an organization. The methods can include: presenting a plurality of objective questions to a user; receiving answers to said plurality of objective questions from said user; determining based on said answers a risk rating for a threat origin of a cyber-attack; determining based on said answers a strength rating for an organizational safeguard against said threat origin; comparing said risk rating of said threat origin to said strength rating of said organizational safeguard; determining based on said comparison a cyber readiness of said organizational safeguard from said cyber-attack by said threat origin; and presenting the cyber readiness of said organizational safeguard. Systems and non-transitory computer readable mediums operating in a similar fashion as such systems are disclosed herein.

27 Claims, 28 Drawing Sheets

(56) References Cited

U.S. PATENT DOCUMENTS

| | | |
|---|---|---|
| 8,019,640 B2 | 9/2011 | Barel et al. |
| 8,135,638 B2 | 3/2012 | Gopfert et al. |
| 8,141,155 B2 | 3/2012 | Jeschke et al. |
| 8,161,060 B2 | 4/2012 | Frayman et al. |
| 8,185,430 B2 | 5/2012 | Edwards et al. |
| 8,214,235 B2 | 7/2012 | Tait et al. |
| 8,255,829 B1 | 8/2012 | McCormick et al. |
| 8,260,653 B1 | 9/2012 | Osterfelt et al. |
| 8,296,244 B1 | 10/2012 | Heroux |
| 8,374,899 B1 | 2/2013 | Heuler et al. |
| 8,375,199 B2 | 2/2013 | Young |
| 8,392,999 B2 | 3/2013 | Adar |
| 8,412,601 B2 | 4/2013 | Grant, Jr. et al. |
| 8,478,788 B1 | 7/2013 | Frazier et al. |
| 8,484,066 B2 | 7/2013 | Miller et al. |
| 8,498,931 B2 | 7/2013 | Abrahams et al. |
| 8,499,330 B1 | 7/2013 | Albisu et al. |
| 8,510,147 B2 | 8/2013 | Mitra et al. |
| 8,515,783 B1 | 8/2013 | Weeks |
| 8,515,804 B2 | 8/2013 | Brennan |
| 8,516,594 B2 | 8/2013 | Bennett et al. |
| 8,543,444 B2 | 9/2013 | Agle et al. |
| 8,595,831 B2 | 11/2013 | Skare |
| 8,621,637 B2 | 12/2013 | Al-Harbi et al. |
| 8,726,393 B2 | 5/2014 | Macy et al. |
| 8,744,894 B2 | 6/2014 | Christiansen et al. |
| 8,793,151 B2 | 7/2014 | DelZoppo et al. |
| 8,793,171 B2 | 7/2014 | Hollas |
| 8,800,037 B2 | 8/2014 | Paek et al. |
| 8,818,837 B2 | 8/2014 | McCalmont et al. |
| 8,839,440 B2 | 9/2014 | Yun et al. |
| 8,856,936 B2 | 10/2014 | Datta Ray et al. |
| 8,955,105 B2 | 2/2015 | Hudis et al. |
| 9,118,714 B1 | 8/2015 | Thomson et al. |
| 9,123,024 B2 | 9/2015 | LeVine et al. |
| 9,129,108 B2 | 9/2015 | Drissi et al. |
| 9,159,246 B2 | 10/2015 | Rodriguez et al. |
| 9,178,902 B1 | 11/2015 | Zagorsky et al. |
| 9,253,203 B1 | 2/2016 | Ng |
| 9,270,694 B2 | 2/2016 | Loder et al. |
| 9,294,498 B1 | 3/2016 | Yampolskiy et al. |
| 9,298,925 B1 | 3/2016 | Crittall et al. |
| 9,367,694 B2 | 6/2016 | Eck et al. |
| 9,401,926 B1 | 7/2016 | Dubow et al. |
| 9,426,169 B2 | 8/2016 | Zandani |
| 9,699,209 B2 | 7/2017 | Ng et al. |
| 2002/0059093 A1 | 5/2002 | Barton et al. |
| 2003/0110410 A1 | 6/2003 | Karpf |
| 2003/0126049 A1 | 7/2003 | Nagan et al. |
| 2004/0044617 A1 | 3/2004 | Lu |
| 2006/0089861 A1 | 4/2006 | King et al. |
| 2006/0117388 A1 | 6/2006 | Nelson et al. |
| 2007/0180522 A1 | 8/2007 | Bagnall |
| 2008/0140514 A1 | 6/2008 | Stenger |
| 2008/0262863 A1 | 10/2008 | Stickley et al. |
| 2009/0024663 A1 | 1/2009 | McGovern |
| 2009/0089195 A1 | 4/2009 | Salomon et al. |
| 2009/0126014 A1 | 5/2009 | Brady et al. |
| 2011/0153383 A1 | 6/2011 | Bhattacharjya et al. |
| 2012/0116839 A1 | 5/2012 | Akkiraju et al. |
| 2012/0296695 A1 | 11/2012 | McGill et al. |
| 2012/0310700 A1 | 12/2012 | Kurtz et al. |
| 2013/0103454 A1 | 4/2013 | Agle et al. |
| 2013/0275176 A1* | 10/2013 | Brown ............... G06Q 10/0635 705/7.28 |
| 2013/0311224 A1 | 11/2013 | Heroux et al. |
| 2013/0346328 A1 | 12/2013 | Agle et al. |
| 2014/0136276 A1 | 5/2014 | Creagh et al. |
| 2014/0188549 A1 | 7/2014 | Saccone |
| 2014/0278734 A1 | 9/2014 | Mather et al. |
| 2014/0337086 A1 | 11/2014 | Asenjo et al. |
| 2014/0380488 A1 | 12/2014 | Datta Ray et al. |
| 2015/0066578 A1 | 3/2015 | Manocchia et al. |
| 2015/0088597 A1 | 3/2015 | Doherty et al. |
| 2015/0134399 A1 | 5/2015 | Eickelmann et al. |
| 2015/0148919 A1 | 5/2015 | Watson |
| 2015/0163242 A1 | 6/2015 | Laidlaw et al. |
| 2015/0172311 A1 | 6/2015 | Freedman et al. |
| 2015/0178651 A1 | 6/2015 | Eickelmann et al. |
| 2015/0227868 A1 | 8/2015 | Saraf et al. |
| 2015/0227869 A1 | 8/2015 | Saraf et al. |
| 2015/0281287 A1 | 10/2015 | Gill et al. |
| 2015/0288712 A1 | 10/2015 | Jones et al. |
| 2015/0379443 A1 | 12/2015 | Whitney |
| 2015/0381649 A1 | 12/2015 | Schultz et al. |
| 2016/0012235 A1 | 1/2016 | Lee et al. |
| 2016/0012360 A1 | 1/2016 | Vinnakota et al. |
| 2016/0012542 A1 | 1/2016 | Steben et al. |
| 2016/0014147 A1 | 1/2016 | Zoldi et al. |
| 2016/0021056 A1 | 1/2016 | Chesla |
| 2016/0034838 A1 | 2/2016 | Gembicki |
| 2016/0050225 A1 | 2/2016 | Carpenter et al. |
| 2016/0092884 A1 | 3/2016 | Weaver et al. |
| 2016/0119373 A1 | 4/2016 | Fausto et al. |
| 2016/0171415 A1 | 6/2016 | Yampolskiy et al. |
| 2016/0173521 A1 | 6/2016 | Yampolskiy et al. |
| 2016/0205126 A1 | 7/2016 | Boyer et al. |
| 2016/0217474 A1 | 7/2016 | Maguire et al. |
| 2016/0217475 A1 | 7/2016 | Maguire et al. |
| 2016/0234242 A1 | 8/2016 | Knapp et al. |
| 2016/0234247 A1 | 8/2016 | Ng et al. |
| 2016/0241580 A1 | 8/2016 | Watters et al. |
| 2016/0241581 A1 | 8/2016 | Watters et al. |
| 2016/0248797 A1 | 8/2016 | Yampolskiy et al. |
| 2016/0248799 A1 | 8/2016 | Ng |
| 2016/0253608 A1 | 9/2016 | DiMartino |
| 2016/0261628 A1 | 9/2016 | Doron et al. |
| 2016/0294854 A1 | 10/2016 | Parthasarathi et al. |
| 2017/0187745 A1 | 6/2017 | Ng et al. |

OTHER PUBLICATIONS

Sommestad et al., "Cyber Security Risk Assessment with Bayesian Defense Graphs and Architectural Models," Royal Institute of Technology, 2009, pp. 1-10, retrieved online from: http://ieeexplore.ieee.org/document/4755419/.

* cited by examiner

FIG. 4

| INDUSTRY TABLE | ORGANIZED CRIME | HACKTIVISTS | NATION STATES / COMPETITOR | NATION STATES / DISRUPTION, DESTRUCTION | DISGRUNTLED EMPLOYEES |
|---|---|---|---|---|---|
| INDUSTRY | | | | | |
| AIRCRAFT | L | M | H | H | H |
| AMUSEMENT PARKS | M | M | L | L | L |
| APARTMENTS & DWELLINGS | L | L | L | L | L |
| AUDITORIUMS | L | L | L | L | L |
| AUTO MFG | L | M | H | M | M |
| CEMENT PLANTS | M | M | M | L | M |
| CHEMICAL | M | H | H | H | H |
| ELECTRICAL EQUIPMENT | L | M | H | M | M |
| EXPANDED PLASTIC & RUBBER | L | H | M | L | H |
| FOOD & BEVERAGE | H | M | M | M | H |
| FOUNDRIES/FORGES | L | M | H | L | H |
| HOSPITALS | H | M | M | M | M |
| HOTELS | H | L | L | L | H |
| IDLE PLANTS | L | L | L | L | L |
| LAUNDRIES | L | M | M | L | L |
| LEATHER WORKING | L | L | M | H | M |
| MACHINE SHOPS | L | M | H | H | M |
| MINING & MINERAL PROCESSING | H | H | M | M | M |
| MISCELLANEOUS NON-MANUFACTURING | M | M | M | M | M |
| MIXED TENANTED MFG | M | M | H | H | H |
| MOLTEN MATERIALS | L | M | L | L | L |
| MULTI HAZARD | L | M | L | L | H |
| PUBLIC BUILDING | L | H | H | M | H |
| FINANCIAL SERVICES | H | H | H | H | H |

FIG. 5

| | ORGANIZED CRIME | HACKTIVISTS | NATION STATES / COMPETITOR | NATION STATES / DISRUPTION, DESTRUCTION | DISGRUNTLED EMPLOYEE |
|---|---|---|---|---|---|
| SWITZERLAND | 2 | 0 | 0 | 0 | 0 |
| NORWAY | 0 | 0 | 0 | 0 | 0 |
| IRELAND | 0 | 0 | 0 | 0 | 0 |
| GERMANY | 2 | 0 | 1 | 1 | 0 |
| LUXEMBOURG | 2 | 0 | 0 | 0 | 0 |
| NETHERLANDS | 0 | 0 | 0 | 1 | 0 |
| CANADA | 0 | 0 | 1 | 1 | 0 |
| AUSTRALIA | 0 | 0 | 1 | 0 | 0 |
| DENMARK | 0 | 0 | 0 | 0 | 0 |
| UNITED STATES | 2 | 2 | 2 | 2 | 2 |
| HONG KONG SAR | 0 | 0 | 1 | 1 | 0 |
| FINLAND | 0 | 0 | 0 | 2 | 0 |
| QATAR | 0 | 1 | 0 | 0 | 0 |
| NEW ZEALAND | 0 | 0 | 0 | 0 | 0 |
| SWEDEN | 0 | 0 | 0 | 0 | 0 |
| BELGIUM | 0 | 0 | 0 | 0 | 0 |
| AUSTRIA | 0 | 0 | 1 | 1 | 0 |
| FRANCE | 0 | 0 | 1 | 1 | 1 |
| UNITED KINGDOM | 1 | 1 | 1 | 1 | 1 |
| ICELAND | 0 | 0 | 0 | 0 | 0 |
| SINGAPORE | 0 | 0 | 1 | 0 | 0 |
| PORTUGAL | 0 | 0 | 0 | 0 | 0 |

HEADQUARTERS COUNTRY TABLE

FIG. 6

PRESENCE COUNTRY TABLE

| | ORGANIZED CRIME | HACKTIVISTS | NATION STATES / COMPETITOR | NATION STATES / DISRUPTION, DESTRUCTION | DISGRUNTLED EMPLOYEE |
|---|---|---|---|---|---|
| SWITZERLAND | 0 | 1 | 2 | 0 | 0 |
| NORWAY | 0 | 0 | 2 | 1 | 0 |
| IRELAND | 0 | 0 | 0 | 1 | 0 |
| GERMANY | 0 | 0 | 2 | 0 | 0 |
| LUXEMBOURG | 0 | 0 | 2 | 0 | 0 |
| NETHERLANDS | 0 | 0 | 0 | 0 | 0 |
| CANADA | 0 | 0 | 0 | 0 | 0 |
| AUSTRALIA | 0 | 0 | 2 | 2 | 0 |
| DENMARK | 0 | 0 | 2 | 0 | 2 |
| UNITED STATES | 1 | 1 | 0 | 0 | 0 |
| HONG KONG SAR | 0 | 0 | 1 | 0 | 1 |
| FINLAND | 1 | 1 | 0 | 0 | 0 |
| QATAR | 0 | 0 | 2 | 1 | 0 |
| NEW ZEALAND | 0 | 0 | 2 | 0 | 0 |
| SWEDEN | 0 | 0 | 0 | 1 | 0 |
| BELGIUM | 0 | 0 | 2 | 2 | 0 |
| AUSTRIA | 0 | 0 | 2 | 0 | 0 |
| FRANCE | 1 | 0 | 0 | 0 | 1 |
| UNITED KINGDOM | 0 | 0 | 0 | 0 | 0 |
| ICELAND | 0 | 0 | 0 | 0 | 1 |
| SINGAPORE | 0 | 0 | 0 | 0 | 0 |
| PORTUGAL | 0 | 1 | 0 | 0 | 2 |
| SPAIN | 2 | 1 | 0 | 0 | 2 |
| MALAYSIA | | | | | |

FIG. 7

| SCENARIO # | INDUSTRY | HEADQUARTER COUNTRY | PRESENCE COUNTRY | PRELIMINARY RISK RATING |
|---|---|---|---|---|
| 1 | M | 1 | 0 | M |
| 2 | H | 2 | 0 | VH |
| 3 | H | 1 | 2 | VH |
| 4 | L | 2 | 0 | L |
| 5 | M | 2 | 2 | H |
| 6 | L | 1 | 0 | L |
| 7 | H | 0 | 1 | M |
| 8 | H | 2 | 2 | VH |
| 9 | L | 1 | 1 | L |
| 10 | M | 2 | 0 | M |
| 11 | M | 1 | 1 | M |
| 12 | H | 1 | 0 | M |
| 13 | M | 0 | 2 | M |

FIG. 8

| ATTACK FROM OUTSIDE | DoS / DDos | HACKING | BOTNETS | MALWARE / RANSOMWARE |
|---|---|---|---|---|
| LOW | LOW | LOW | LOW | LOW |
| LOW | LOW | LOW | LOW | MEDIUM |
| MEDIUM | LOW | LOW | LOW | HIGH |
| HIGH | LOW | LOW | LOW | VERY HIGH |
| LOW | LOW | LOW | MEDIUM | LOW |
| MEDIUM | LOW | LOW | MEDIUM | MEDIUM |
| MEDIUM | LOW | LOW | MEDIUM | HIGH |
| HIGH | LOW | LOW | MEDIUM | VERY HIGH |
| MEDIUM | LOW | LOW | HIGH | LOW |
| MEDIUM | LOW | LOW | HIGH | MEDIUM |
| HIGH | LOW | LOW | HIGH | HIGH |
| HIGH | LOW | LOW | HIGH | VERY HIGH |
| HIGH | LOW | LOW | VERY HIGH | LOW |
| HIGH | LOW | LOW | VERY HIGH | MEDIUM |
| HIGH | LOW | LOW | VERY HIGH | HIGH |
| VERY HIGH | LOW | LOW | VERY HIGH | VERY HIGH |
| LOW | LOW | MEDIUM | LOW | LOW |
| MEDIUM | LOW | MEDIUM | LOW | MEDIUM |
| MEDIUM | LOW | MEDIUM | LOW | HIGH |
| HIGH | LOW | MEDIUM | LOW | VERY HIGH |

FIG. 12

| USE OF INSIDERS | USE OF INSIDER EMPLOYEE | VIA TRUSTED THIRD PARTY PROVIDER / VENDOR | SOCIAL ENGINEERING (NOT PHISHING) | PHISHING | VISHING |
|---|---|---|---|---|---|
| LOW | LOW | LOW | LOW | LOW | LOW |
| LOW | LOW | LOW | LOW | LOW | MEDIUM |
| MEDIUM | LOW | LOW | LOW | LOW | HIGH |
| HIGH | LOW | LOW | LOW | LOW | VERY HIGH |
| LOW | LOW | LOW | LOW | MEDIUM | LOW |
| MEDIUM | LOW | LOW | LOW | MEDIUM | MEDIUM |
| MEDIUM | LOW | LOW | LOW | MEDIUM | HIGH |
| HIGH | LOW | LOW | LOW | MEDIUM | VERY HIGH |
| MEDIUM | LOW | LOW | LOW | HIGH | LOW |
| MEDIUM | LOW | LOW | LOW | HIGH | MEDIUM |
| HIGH | LOW | LOW | LOW | HIGH | HIGH |
| HIGH | LOW | LOW | LOW | HIGH | VERY HIGH |
| HIGH | LOW | LOW | LOW | VERY HIGH | LOW |
| HIGH | LOW | LOW | LOW | VERY HIGH | MEDIUM |
| VERY HIGH | LOW | LOW | LOW | VERY HIGH | HIGH |
| LOW | LOW | LOW | MEDIUM | LOW | VERY HIGH |
| MEDIUM | LOW | LOW | MEDIUM | LOW | LOW |
| MEDIUM | LOW | LOW | MEDIUM | LOW | MEDIUM |

PROGRAM GOVERNANCE AND OVERSIGHT — 121a

1. WHAT INFORMATION SECURITY STANDARD DOES YOUR ORGANIZATION BASE ITS CYBERSECURITY FRAMEWORK ON? CHECK ALL THAT APPLY.

| Standard | |
|---|---|
| FISMA / NIST SP 800-53 | X |
| ISO/IEC 27001 / 27002 | X |
| SANS - CIS TOP 20 CSC | X |
| COMMITTEE ON NATIONAL SECURITY SYSTEMS (CNSSI) | |
| NIST CYBER SECURITY FRAMEWORK | |
| COBIT | |
| NERC 1300 | |
| ISF STANDARD OF GOOD PRACTICE | |
| PCI-DSS | |
| OTHER | |
| NONE OF THE ABOVE | |

— 135a

135b:
| DEFICIENT | IF NO EXTERNAL STANDARDS ARE USED |
| ACCEPTABLE | IF ONE BOX CHECKED |
| GOOD | IF MORE THAN ONE BOX CHECKED |
| BETTER | NIST CSF |

2. ARE YOU INDEPENDENTLY ASSESSED BY A THIRD PARTY FOR ANY OF THE FOLLOWING STANDARDS?

| Standard | ASSESSED |
|---|---|
| FISMA / NIST SP 800-53 | |
| ISO/IEC 27001 | NO |
| ISO/IEC 27002 | |
| SANS - CIS TOP 20 CSC | ASSESSED & CERTIFIED |
| COMMITTEE ON NATIONAL SECURITY SYSTEMS (CNSSI) | |
| COBIT | |
| NERC 1300 | |
| ISF STANDARD OF GOOD PRACTICE | |
| PCI-DSS | |
| OTHER | |

— 136a (ANSWER OPTIONS: NO / ASSESSED / ASSESSED AND CERTIFIED)

136b:
| DEFICIENT | NO (ALL) |
| GOOD | AT LEAST ONE ASSESSED |
| BETTER | AT LEAST ONE CERTIFIED |

2B. IF ASSESSED OR CERTIFIED BY AN INDEPENDENT THIRD PARTY, PLEASE INDICATE THE NAME OF THE COMPANY OR ORGANIZATION, ALONG WITH THE CERTIFICATION AWARDED. — 137a
EX. VERIZON, PwC, ACCENTURE, DELOITTE, INFO SEC STANDARDS BODY, ETC. — 137b INFORMATIONAL PURPOSES

FIG. 17A

3. WHAT IS THE FREQUENCY OF THE ASSESSMENT AND RE-CERTIFICATION PROCESS?
   EVERY 6 MONTHS, EVERY YEAR, EVERY 2 YEARS, AD HOC, UNSURE

| DEFICIENT | AD HOC / UNSURE |
| ACCEPTABLE | EVERY 2 YEAR |
| GOOD | EVERY 6 MONTHS / EVERY YEAR |

(138a / 138b)

4. IS YOUR ORGANIZATION COMPLIANT WITH ALL APPLICABLE LEGAL REGULATORY REQUIREMENT?
   YES / NO / NOT SURE

| DEFICIENT | NO / NOT SURE |
| GOOD | YES |

(139a / 139b)

5. WHICH REGULATORY FRAMEWORKS, OR WHICH REGULATORY BODIES, ARE APPLICABLE TO YOU? CHECK ALL THAT APPLY.

| HIPAA | X |
| FISMA | |
| REGULATION SCI | |
| PCI-DSS | |
| FFIEC | |
| SARBANES-OXLEY (SOX) | |
| GRAMM-LEACH-BLILEY ACT (GLBA) | |
| BANK SECRECY ACT (BSA) | |
| EUROPEAN UNION DATA PROTECTION DIRECTIVE | |
| OTHER (PLEASE LIST) | |

NOT RATED. JUST USED TO COLLECT INFORMATION (140a / 140b)

FIG. 17B

6. DOES YOUR COMPANY HAVE A CENTRALIZED COMPLIANCE PROCESS AND TRACKING FUNCTION?
   YES / NO
   6A. IF YES: CHECK ALL THAT APPLY

| | |
|---|---|
| COMPLIANCE TRACKING AGGREGATES LEGAL AND REGULATORY REQUIREMENTS ACROSS THE ORGANIZATION (COUNTRY, STATE, DISTRICT) | X |
| COMPLIANCE TRACKING HAS A DEDICATED MODULE THAT FOCUSES ON INFORMATION SECURITY COMPLIANCE STANDARDS | |
| COMPLIANCE TRACKING CAPTURES OWNERSHIP, STATUS OF COMPLIANCE (DEFICIENT OR COMPLIANT), AND TESTING SCHEDULES AND PLANS | X |
| COMPLIANCE TRACKING HOSTS DIGITAL EVIDENCE THAT CAN BE USED AS VALIDATION OF TESTING | X |
| COMPLIANCE REPORTS CAN BE RUN CONTINUALLY, AND GIVE UP TO DATE VIEWS TO EXECUTIVE MANAGEMENT FOR OVERSIGHT AND GOVERNANCE RESPONSIBILITIES | X |

141a

IF NO COMPLIANCE PROCESS, RANK AS DEFICIENT
OTHERWISE, USE MATRIX BELOW:

| AGGREGATES LEGAL AND REGULATORY | MODULE FOR SECURITY COMPLIANCE | OWNERSHIP AND STATUS OF COMPLIANCE | HOSTS DIGITAL EVIDENCE | CONTINUOUS REPORTING | COMPLIANCE PROCESS TRACKING |
|---|---|---|---|---|---|
| YES | YES | YES | YES | YES | GOOD |
| YES | YES | YES | YES | NO | ACCEPTABLE |
| YES | YES | YES | NO | YES | ACCEPTABLE |
| YES | YES | YES | NO | NO | ACCEPTABLE |
| YES | NO | NO | YES | YES | ACCEPTABLE |
| NO | NO | NO | NO | YES | ACCEPTABLE |
| NO | NO | NO | NO | NO | DEFICIENT |

141b

FIG. 17C 142a. 7. WHAT IS THE STATUS OF IMPLEMENTATION OF THE CYBER RISK PROGRAM?
THIS NUMBER SHOULD BE DERIVED FROM THE PREVIOUS ANSWERS AND BEST JUDGEMENT.
0-25% / 26-50% / 51-75% / 76-100%

142b. DEFICIENT — <50%
GOOD — >50%

143a. 8. WHAT IS YOUR DEDICATED CYBER SECURITY BUDGET (E.G. FOR SERVERS, NETWORK BOUNDARY DEFENCES ETC.) AS A PERCENTAGE OF YOUR OVERALL INFORMATION TECHNOLOGY (IT) BUDGET?
UNKNOWN / 0-5% / 5-10% / 10-15% / 15-20% / >20%

143b. RANK BASED ON EVALUATION MATRIX.

| UNKNOWN | LOW |
|---|---|
| 0-5% | LOW |
| 5-10% | AVERAGE |
| 10-15% | AVERAGE |
| 15-20% | HIGH |
| >20% | HIGH |

144a. 9. DOES YOUR CYBER RISK STRATEGY TAKE INTO CONSIDERATION PHYSICAL SECURITY CONTROLS SUCH AS, BUILDING CONTROL, SWIPE CARDS, CAMERAS, ETC...DOES YOUR CYBER RISK STRATEGY TAKE INTO CONSIDERATION BUILDING CONTROL SYSTEMS SUCH AS BADGE ACCESS, UTILITIES, SWIPE CARDS, CAMERAS, ETC...
YES/NO
9A. DO YOU HAVE AN ADDITIONAL BUDGET TO ADDRESS THESE ISSUES?
YES/NO

144b. RANK BASED ON EVALUATION MATRIX.

| UNKNOWN | LOW |
|---|---|
| 0-5% | LOW |
| 5-10% | AVERAGE |

145a. 10. WHAT IS THE LEVEL OF ENGAGEMENT OF MANAGEMENT WITH CYBER SECURITY?

| | NOT-INFORMED | AD-HOC / BRIEFED AS NECESSARY | REVIEW AS PART OF REGULAR OPERATING RHYTHM (AT LEAST QUARTERLY) | ACTIVELY ENGAGED IN SETTING ROADMAP, TIMELINES, ETC. |
|---|---|---|---|---|
| CIO / CTO | | X | | |
| CEO / CRO / COO / CFO | | | | X |
| BOARD OF DIRECTORS | X | | | |

145b. ONLY REGULAR MEETINGS IMPLY DIRECT RESPONSIBILITY. THUS, USE THE HIGHEST LEVEL WITH REGULAR OPERATING RHYTHM CHECKED.
CIO / CTO
CEO / CRO / COO / CFO
BOARD OF DIRECTORS

FIG. 17D

| | STRENGTH RATING | | | |
| --- | --- | --- | --- | --- |
| | GOOD (178a) | ACCEPTABLE (178b) | DEFICIENT (178c) | TBD (178d) |
| VERY HIGH (179a) | OK | POSSIBLE CONCERN | SEVERE GAP | N/A |
| HIGH (179b) | OK | POSSIBLE CONCERN | SEVERE GAP | N/A |
| MEDIUM (179c) | OK | OK | SEVERE GAP | N/A |
| LOW (179d) | OK | OK | POSSIBLE CONCERN | N/A |
| VERY LOW (179e) | OK | OK | POSSIBLE CONCERN | N/A |

RISK RATINGS (rows) — table 177

FIG. 20

SYSTEMS AND METHODS FOR CYBER SECURITY RISK ASSESSMENT

TECHNICAL FIELD

The present disclosure relates to a system for cyber-risk assessment of an organization, and more specifically, to modeling cyber readiness of an organization against possible cyber-risks.

BACKGROUND

Cyber-attacks relate to malicious attempts through cyber-space or physical access to alter, manipulate, destruct, deny, degrade or destroy an organization's computers or networks, or the information residing in them, with the effect, in cyber space or the physical world, of compromising stability or prosperity of an organization. As such, cyber-attacks can come in many different forms including, but not limited to, hacking, malware, ransomware, botnets, DoS, social engineering, and phishing. Along these lines, cyber-attacks may come from different sources including, but not limited to, an attack from outside the organization, an attack from inside the organization by and/or through an individual within the organization, and a use of physical access.

As such, organizations must have multiple processes and technologies in place to deter and defend against cyber-attacks, as well as must employ evaluations to ensure their cyber readiness. However, given the numerous different types of cyber-attacks, and the complexity of cyber-security processes and measures, it is difficult to adequately determine the sufficiency of an organization's processes and technologies in deterring and defending against cyber threats.

SUMMARY OF THE INVENTION

In an embodiment of the present invention, a method for evaluating cyber readiness of an organization is provided, including: presenting a plurality of objective questions to a user, wherein each of the objective questions has one or more predefined answers to be selected by the user; receiving answers to the plurality of objective questions from the user; determining based on the answers a risk rating for a threat origin of a cyber-attack; determining based on the answers a strength rating for an organizational safeguard against the threat origin; comparing the risk rating of the threat origin to the strength rating of the organizational safeguard; determining based on the comparison a cyber readiness of the organizational safeguards from the cyber-attack by the threat origin; and presenting the cyber readiness rating of the organizational safeguard.

In another embodiment of the present invention, a system for evaluating cyber readiness of an organization is provided, including: a memory storage device and a processor in communication with the memory storage device. The processor is configured to: present a plurality of objective questions to a user, wherein each of the objective questions has one or more predefined answers to be selected by the user; receive answers to the plurality of objective questions from the user; determine based on the answers a risk rating for a threat origin of a cyber-attack; determine based on the answers a strength rating for an organizational safeguard against the threat origin; compare the risk rating of the threat origin to the strength rating of the organizational safeguard; determine based on the comparison the cyber readiness of the organizational safeguard from the cyber-attack by the threat origin; and present the cyber readiness rating of the organizational safeguard.

In yet another embodiment of the present invention, a non-transitory computer-readable medium tangibly storing computer program instructions is provided, which when executed by a processor, causes the processor to: present a plurality of objective questions to a user, wherein each of the objective questions has one or more pre-defined answers to be selected by the user; receive answers to the plurality of objective questions from the user; determine based on the answers a risk rating for a threat origin of a cyber-attack; determine based on the answers a strength rating for an organizational safeguard against the threat origin; compare the risk rating of the threat origin to the strength rating of the organizational safeguard; determine based on the comparison a cyber readiness of the organizational safeguard from the cyber-attack by the threat origin; and present the cyber readiness rating of the organizational safeguard.

Other features and advantages will become apparent from the following description, taken in connection with the accompanying drawings, wherein, by way of illustration and example, embodiments of the invention are disclosed.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIG. 4 illustrates an exemplary user interface presenting a plurality of questions to determine an inherent risk profile of an organization in accordance with embodiments of the present invention;

FIGS. 5-9 illustrate exemplary portions of look-up tables for determining a risk rating for one or more threat actors against an organization in accordance with embodiments of the invention;

FIGS. 12-14 illustrate exemplary portions of look-up tables for determining a risk rating for one or more threat sources for an inherent risk profile of an organization in accordance with embodiments of the invention;

FIG. 16 illustrates an exemplary user interface presenting questions to determine a cyber preparedness profile of an organization in accordance with embodiments of the present invention;

FIGS. 20 and 21 illustrate an exemplary look-up table to determine a relationship between a risk rating of a threat source and a strength rating of an organizational safeguard in accordance with embodiments of the present invention;

DETAILED DESCRIPTION OF THE PRESENT INVENTION

Reference will now be made in detail to various embodiments of the present invention, examples of which are illustrated in the accompanying drawings. It is to be understood that the figures and descriptions of the present invention included herein illustrate and describe elements that are of particular relevance to the present invention. It is also important to note that any reference in the specification to "one embodiment," "an embodiment" or "an alternative embodiment" means that a particular feature, structure or characteristic described in connection with the embodiment is included in at least one embodiment of the invention. As such, the recitation of "in one embodiment" and the like throughout the specification does not necessarily refer to the same embodiment.

Figure 1:
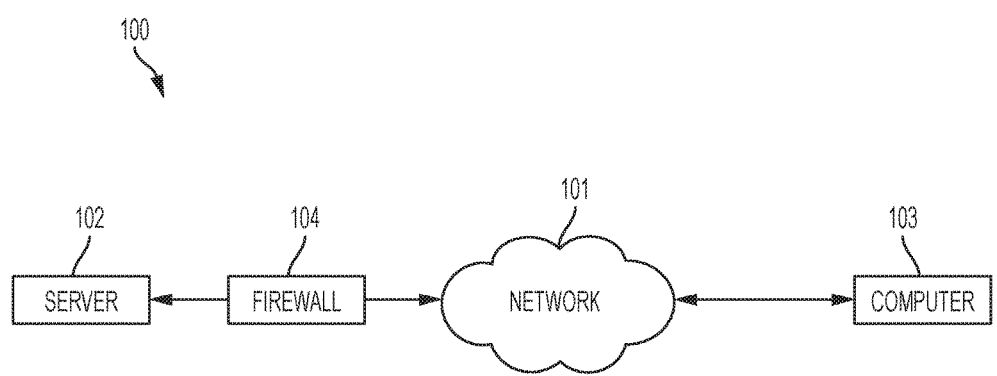
FIG. 1 illustrates an exemplary system that can be utilized to determine cyber readiness of an organization in accordance with embodiments of the present invention.

The systems and methods disclosed herein are directed to evaluating cyber readiness of an organization. Cyber readiness can refer to the process of integrated security measure across a system or infrastructure of an organization that monitors for and/or deters cyber threats. Referring now to FIG. 1, an exemplary system shown generally as reference 100 is provided for determining cyber readiness of an organization. The system 100 can include a network 101, a server 102, a computing device 103, and a firewall 104. Network 101 can comprise a public and/or private network, such as a local area network (LAN), a wide area network (WAN), the Internet, a virtual LAN (VLAN), an enterprise LAN, a virtual private network (VPN), an enterprise IP network, or any combination thereof. Server 102 can store information for evaluating cyber readiness of the organization, as will be discussed in more detail below. Computing device 103 can provide access to the server 102 to evaluate cyber readiness of the organization. Firewall 104 can be provided between server 102 and computing device 103. Firewall 104 can deter an unauthorized user from accessing a private network of the system 100. As such, a user can evaluate cyber readiness of the organization from one or both of server 102 and computing device 103. The cyber readiness evaluation can provide a cyber preparedness profile of the organization, as will be discussed in more detail below.

Figure 2:
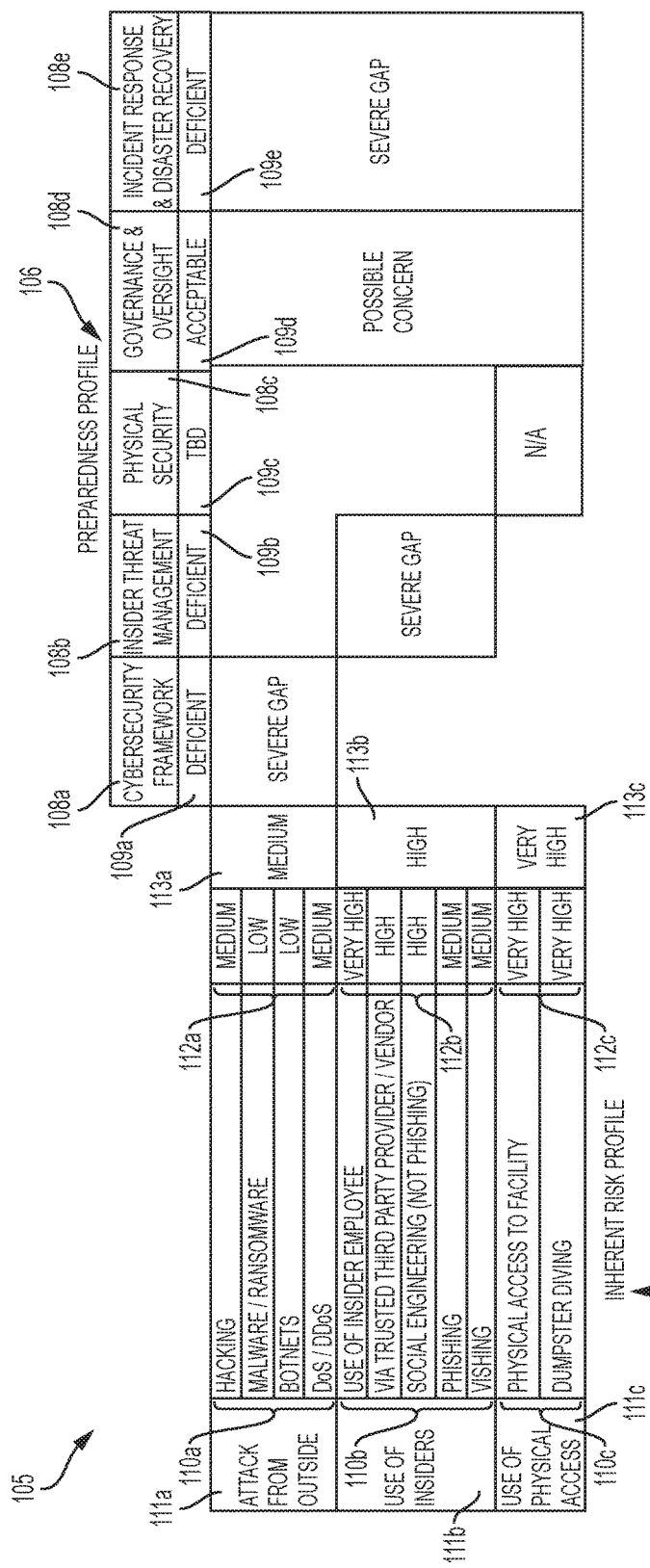
FIG. 2 illustrates an exemplary cyber readiness profile of an organization in accordance with embodiments of the present invention.

Referring now to FIG. 2, an exemplary cyber readiness profile 105 of an organization is illustrated. The cyber readiness profile 105 can comprise a cyber preparedness profile 106 of an organization referenced against an inherent risk profile 107 of the organization. The cyber preparedness profile 106 can comprise one or more evaluation categories 108 a-e and a strength rating 109 a-e for each of the evaluation categories 108 a-e. The evaluation categories 108 a-e can refer to one or more internal processes of an organization designed to deter a cyber-attack. For example, as illustrated, the evaluation categories 108 a-e can comprise "Cybersecurity Framework," "Insider Threat Management," "Governance & Oversight," "Incident Response & Disaster Recovery," and "Physical Security;" however, other organizational safeguards can be included. "Cybersecurity Framework" can refer to an underlying framework for assessing and/or improving an organization's ability to prevent, detect, and respond to cyber-attacks. "Insider Threat Management" can refer to a process of preventing, combating, detecting, and monitoring employees, vendors, and contractors from theft, fraud and damage of property. "Governance & Oversight" can refer to an operating model that organizes risk-management and reporting processes to ensure that an organization enters good governance, and conducts work in compliance with regulation and strategic goals. "Incident Response" can refer to a process in addressing and managing a cyber-attack. "Disaster Recovery" can refer to a plan for recovering from a cyber-attack and continuing operations. "Physical Security" can refer to protection of buildings and computer hardware from unauthorized access and/or tampering.

Moreover, the strength rating 109 a-e can refer to a quality level of protecting one or more organizational resources from one or more avenues of a cyber-attack. As such, the strength rating 109 a-e can be a plurality of levels. The levels can be presented to a user in the form of text and/or color. According to an embodiment, the strength rating 109 a-e can be presented to a user as "Good," "Acceptable," "Deficient," or "TBD." According to another embodiment, the strength rating 109 a-e can be presented to a user as green, yellow, red, or gray. The color green can represent "Good," the color yellow can represent "Acceptable," the color red can represent "Deficient," and the color gray can represent "TBD." "TBD" can refer to an insufficient amount of information entered into the system for assessment of the organizational safeguard at hand.

The inherent risk profile 107 can comprise one or more threat vectors 110 a-c and/or one or more threat origins 111 a-c. The threat vectors 110 a-c can be a method in which a threat source attempts to alter, manipulate, destruct, deny, degrade or destroy an organizational resource with or without authorized access. For example, as shown, the threat vectors 110 a-c can be "Hacking," "Malware/Ransomware," "Botnets," "DoS/DDoS," "Use of Insider Employee," "Via Trusted Third Party Provider/Vendor," "Social Engineering (Not Phishing)," "Phishing," "Vishing," "Physical Access to Facility," and "Dumpster Diving."

Along these lines, the threat origins 111 a-c can refer to a method or location in which a threat origin attempts to alter, manipulate, destruct, deny, degrade or destroy an organizational resource with or without authorized access. For example, as shown, the threat origins 111 a-c fall into categories such as "Attack from Outside," "Use of Insiders," and "Use of Physical Access." "Attack from Outside" can refer to an individual outside of an organization attempting to access an organizational resource by a connection to the organization that is available to the individual from the outside. "Use of Insiders" can refer to an individual inside (e.g., employee) an organization, or related to the organization (e.g., vendor), using legitimate access granted to the individual with malicious intent. "Use of Physical Access"

can refer to an individual outside of an organization that acquires unauthorized access to an organizational resource by gaining access to the organization's physical facilities or property.

As such, the threat origins 111 *a-c* can each comprise one or more threat vectors 110 *a-c*. Accordingly, the threat vectors 110 *a-c* can be grouped according to their threat origin 111 *a-c*. For example, as illustrated, the threat origin 111 *a*—"Attack from Outside"—can comprise the threat vectors 110 *a*—"Hacking," "Malware/Ransomware," "Botnets," and "DoS/DDoS." Also, threat origin 111 *b*—"Use of Insiders"—can comprise the threat vectors 110 *b*—"Use of Insider Employee," "Via Trusted Third Party Provider/Vendor," "Social Engineering (Not Phishing)," "Phishing," and "Vishing."

In addition, the inherent risk profile 107 can comprise a risk rating 112 *a-c* for the threat vectors 110 *a-c* and/or a risk rating 113 *a-c* for the threat origins 111 *a-c*. The risk ratings 112 *a-c*, 113 *a-c* can refer to a likelihood of receiving a cyber-attack from the threat vectors 110 *a-c* and/or threat origins 111 *a-c*. As such, the risk ratings 112 *a-c*, 113 *a-c* for the threat vectors 110 *a-c* and/or threat origins 111 *a-c* can comprise a plurality of levels. The plurality of levels can be the same or different for the threat vectors 110 *a-c* and threat origins 111 *a-c*. Along these lines, the plurality of levels for the threat vectors 110 *a-c* and/or threat origins 111 *a-c* can be the same or different than those of the evaluation categories 108 *a-e*.

Moreover, the risk rating 112 *a-c*, 113 *a-c* for the threat vectors 110 *a-c* and/or the threat origins 111 *a-c* can be presented to a user in the form of text and/or color. According to an embodiment, the risk ratings 112 *a-c*, 113 *a-c* of the threat vectors 110 *a-c* and/or the threat origins 111 *a-c* can be presented to a user as "Very High," "High," "Medium," "Low," or "Very Low." According to another embodiment, the risk ratings 112 *a-c*, 113 *a-c* of the threat vectors 110 *a-c* and/or the threat origins 111 *a-c* can be presented to a user as a medium shade of red, a light shade of red, a medium shade of yellow, a medium shade of green, or a light shade of green. The medium shade of red can represent "Very High," the light shade of red can represent "High," the medium shade of yellow can represent "Medium," the medium shade of green can represent "Low," and the light shade of green can represent "Very Low."

Figure 3:
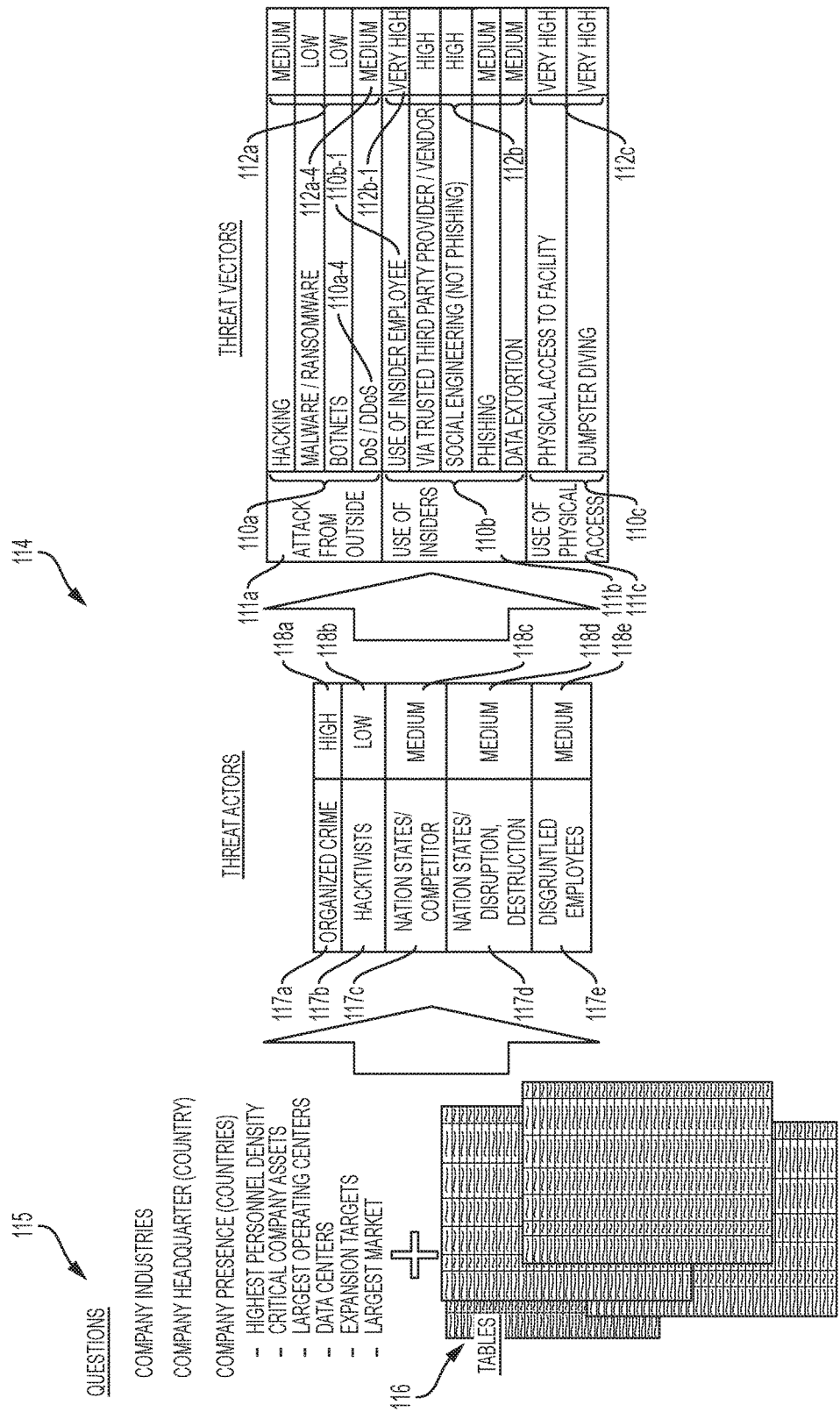
FIG. 3 illustrates an exemplary process for determining an inherent risk profile of an organization in accordance with embodiments of the invention.

To determine the inherent risk profile 107, an inherent risk assessment may be performed. Referring now to FIG. 3, an exemplary inherent risk assessment 114 is provided. The inherent risk assessment 114 can comprise a plurality of questions 115 and a plurality of look-up tables 116 corresponding to one or more of the questions 115. The questions can be answered, for example, using drop down menus, radio buttons, check boxes, or the like. The questions 115 can relate to the organization, such as the organization's industries, headquarters (country), and presence (countries). The questions 115 relating to the organization's industries, headquarters, and presence can be utilized to determine a likelihood of being attacked by different threat actors 117 *a-e*, as will be discussed in more detail below.

The look-up tables 116 can each comprise each possible answer or combination of answers a user may select for a particular question and a preliminary risk rating relating to a likelihood of being attacked by one or more threat actors for each possible answer. The preliminary risk rating can be one of a plurality of threat levels and, thus, can be the same or different for each of the look-up tables 116. Along these lines, each of the look-up tables can comprise the same threat actor(s) 117 *a-e* (e.g., "Organized Crime," "Hactivists," "Nation States/Competitor," "Nation States/Disruption, Destruction," and "Disgruntled Employees."). Based on the answers to one or more questions 115, the inherent risk assessment 114 can determine the risk of cyber-attack via one or more threat actors 117 *a-e* and a cumulative risk rating 118 *a-e* for each of the threat actors 117 *a-e*. Along these lines, based on the threat actors 117 *a-e* and their cumulative risk ratings 118 *a-e*, the inherent risk assessment 114 can also determine a risk rating 112 *a-c* for one or more threat vectors 110 *a-c* of one or more threat origins 111 *a-c*.

Figure 4:
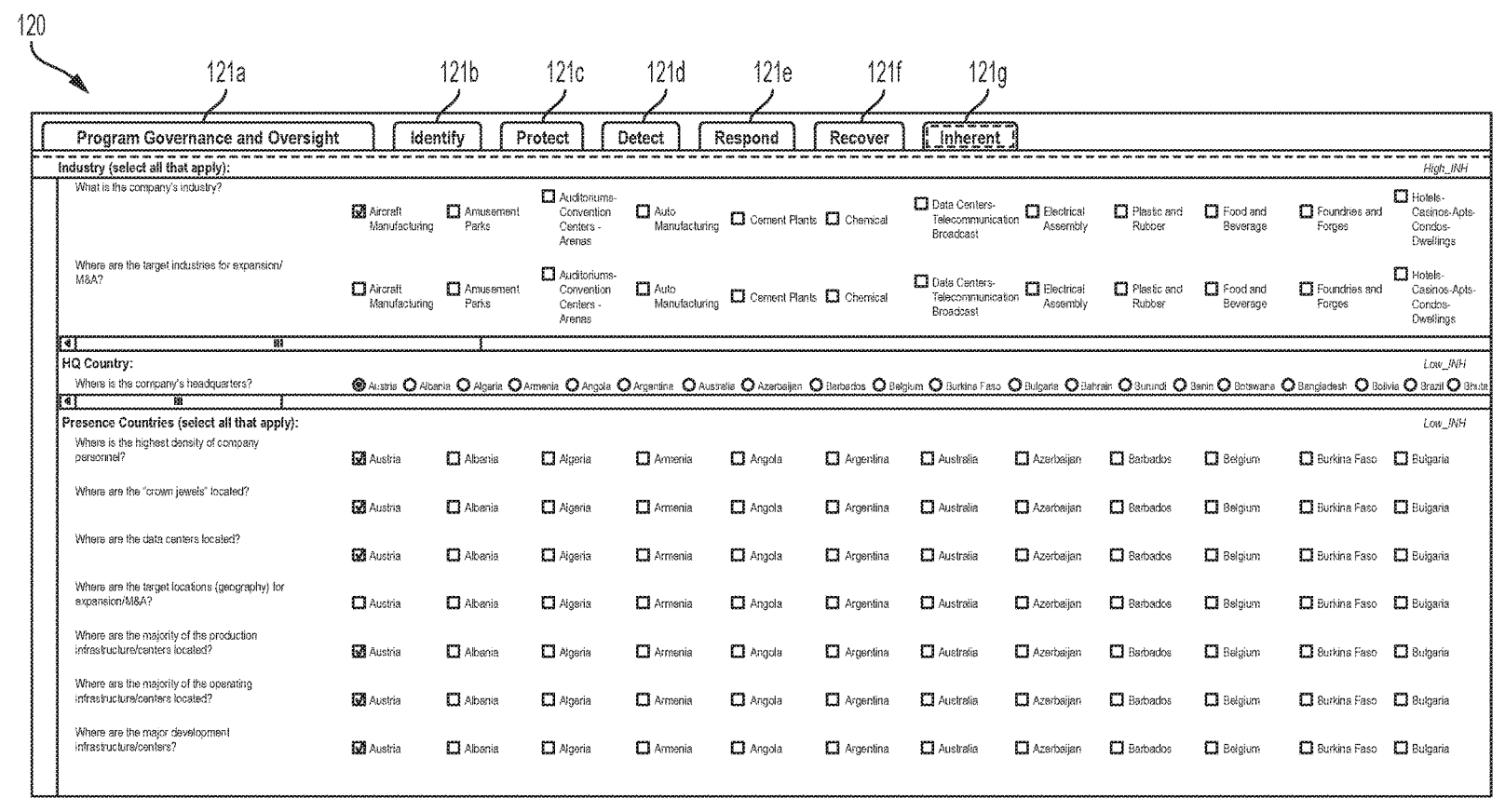

Referring now to FIG. 4, an exemplary user interface 120 for presenting a plurality of questions to a user is provided. The user interface 120 can comprise a plurality of categories 121 *a-g* each having one or more questions. As such, one or more of the categories 121 *a-g* can comprise one or more questions relating to either the inherent risk assessment or the cyber preparedness assessment. According to an embodiment, the categories 121 *a-g* can be "Program Governance and Oversight," "Identify," "Protect," "Detect," "Respond," "Recover," and "Inherent." For example, as shown, the "Inherent" category 121 *g* can comprise a plurality of questions relating to the inherent risk assessment. As will be discussed in more detail below, the "Program Governance and Oversight," "Identify," "Protect," "Detect," "Respond," and "Recover" categories 121 *a-f* can each contain one or more questions relating to the cyber preparedness assessment.

As such, the questions presented in categories 121 *a-g* can comprise one or more objective questions having predefined answers for selection by a user. Alternatively, the questions presented in categories 121 *a-g* can permit a user to manually input a free-form answer. As such, the questions presented in categories 121 *a-g* can be for informational purposes only (free-form answers) and/or for the inherent risk assessment or the cyber preparedness assessment. According to an embodiment, the inherent risk assessment can only be based on one or more objective questions having predefined answers for selection by a user. According to another embodiment, the questions permitting a user to manually input a free-form answer can only be used for informational purposes.

Referring now to FIG. 5, an exemplary portion 122 of a look-up table for one or more questions relating to an organization's industries is provided. The look-up table can comprise each possible industry, or combination of industries, a user can select for the objective question(s) relating to the organization's industries and a preliminary risk rating relating to a likelihood of being attacked by each of the threat actors 117 *a-e* given the organization's presence in each industry. The threat actors 117 *a-e* can be grouped into categories, including "Organized Crime," "Hacktivists," "Nation States/Competitor," "Nation States/Disruption, Destruction," and "Disgruntled Employee." "Organized Crime" can refer to criminal activities that are planned and carried out by one or more individuals. "Hacktivists" can refer to an individual attempting to hack a website or computer network without permission in an effort to convey a social or political message. "Nation States/Competitor" can refer to one or more nations that act with the goal of industrial espionage. "Nation States/Disruption, Destructions" can refer to one or more nations that act with the goal of disrupting or destroying an organization's resources. "Disgruntled Employee" can refer to an employee of the organization who is angry or dissatisfied. The preliminary risk rating can be one of a plurality of threat levels. The threat levels can represent the relative likelihood of being attacked by a particular threat actor. For example, the threat levels can be "High," "Medium," or "Low".

Upon selection of multiple industries, the inherent risk assessment can select the highest risk rating for each of the threat actors 117 a-e corresponding to the selected industries. For example, the "Aircraft" industry has a low risk of being attacked by "Organized Crime," a medium risk of being attacked by "Hacktivists," a high risk of being attacked by "Nation States/Competitor," a high risk of being attacked by "Nation States/Disruption, Destruction," and a high risk of being attacked by "Disgruntled Employees." Whereas, the "Amusement Parks" industry has a medium risk of being attacked by "Organized Crime," a medium risk of being attacked by "Hacktivists," a low risk of being attacked by "Nation States/Competitor," a low risk of being attacked by "Nation States/Disruption, Destruction," and a low risk of being attacked by "Disgruntled Employees." Moreover, the "Hotels" industry has a high risk of being attacked by "Organized Crime," a medium risk of being attacked by "Hacktivists," a high risk of being attacked by "Nation States/Competitor," a low risk of being attacked by "Nation States/Disruption, Destruction," and a medium risk of being attacked by "Disgruntled Employees."

As such, upon selection of both the "Aircraft" and "Amusement Parks" industries (and no others), the inherent risk assessment can determine the organization has a medium risk of being attacked by "Organized Crime," a medium risk of being attacked by "Hacktivists," a high risk of being attacked by "Nation States/Competitor," a high risk of being attacked by "Nation States/Disruption, Destruction," and a high risk of being attacked by "Disgruntled Employees." Moreover, upon selection of each of the "Aircraft," "Amusement Parks," and Hotels" industries (and no others), the inherent risk assessment can determine the organization has a high risk of being attacked by "Organized Crime," a medium risk of being attacked by "Hacktivists," a high risk of being attacked by "Nation States/Competitor," a high risk of being attacked by "Nation States/Disruption, Destruction," and a high risk of being attacked by "Disgruntled Employees."

Referring now to FIGS. 6 and 7, exemplary portions of look-up tables for questions relating to an organization's headquarters and presence countries are illustrated. The organization's headquarters can refer to a country in which the organization is legally domiciled and/or based. The organization's presence can refer to a country in which the organization performs a significant aggregation of key corporation operations or infrastructure, such as data centers, production facilities, research and devolvement, and a large employee base.

As such, FIG. 6 provides an exemplary portion 123 of a look-up table comprising each possible country for an organization headquarters a user may select and a preliminary risk rating relating to a possible increase in the likelihood of being attacked by each of threat actors 117 a-e in each headquarter country. FIG. 7 provides an exemplary portion 124 of a look-up table comprising each possible country for an organization's presence a user may select and a preliminary risk rating relating to the likelihood of being attacked by each of threat actors 117 a-e in each presence country. As such, the look-up table of FIG. 6 and the look-up table of FIG. 7 can each increase the preliminary risk rating describe above in relation to FIG. 5. Moreover, like FIG. 5, the threat actors 117 a-e of FIGS. 6 and 7 are "Organized Crime," "Hacktivists," "Nation States/Competitor," "Nation States/Disruption, Destruction," and "Disgruntled Employee." However, the preliminary risk rating of being attacked by the threat actors 117 a-e of FIGS. 6 and 7 can comprise a plurality of threat levels different or the same as those utilized in FIG. 5. For example, the threat levels can comprise 0 (no increase in risk rating), 1 (some increase in risk rating), or 2 (large increase in risk rating).

Upon selection of multiple countries for the organization's headquarters and/or presence, the inherent risk assessment can select the highest rating for each threat actor 117 a-e. For example, as illustrated in FIG. 7, Switzerland has a threat level of "0" for "Organized Crime," a threat level of "1" for "Hacktivists," a threat level of "2" for "Nation States Competitor," a threat level of "0" for "Nation States/Disruption, Destruction," and a threat level of "0" for "Disgruntled Employee." Whereas, the country of Norway has a threat level of "0" for "Organized Crime," a threat level of "0" for "Hacktivists," a threat level of "2" for "Nation States Competitor," a threat level of "1" for "Nation States Disruption, Destruction," and a threat level of "0" for "Disgruntled Employee." Moreover, the country of Qatar has a threat level of "1" for "Organized Crime," a threat level of "1" for "Hacktivists," a threat level of "1" for "Nation States/Competitor," a threat level of "0" for "Nation States Disruption, Destruction," and a threat level of "1" for "Disgruntled Employee."

As such, upon selection of both the "Switzerland" and "Norway" for the organization's presence (and no others), the inherent risk assessment can determine the organization has a threat level of "0" for "Organized Crime," a threat level of "1" for "Hacktivists," a threat level of "2" for "Nation States/Competitor," a threat level of "1" for "Nation States/Disruption, Destruction," and a threat level of "0" for "Disgruntled Employee." Moreover, upon selection of each of "Switzerland," "Norway," and "Qatar" for the organization's presence (and no others), the inherent risk assessment can define the organization has a threat level of "1" for "Organized Crime," a threat level of "1" for "Hacktivists," a threat level of "2" for "Nation States/Competitor," a threat level of "1" for "Nation States/Disruption, Destruction," and a threat level of "1" for "Disgruntled Employee."

Therefore, to determine a cumulative risk rating for one or more threat actors 117 a-e, a cumulative look-up table may be used. Referring now to FIG. 8, an exemplary portion 125 of a cumulative look-up table is provided. The cumulative look-up table can comprise an exhaustive list of scenarios representing each possible combination of outcomes from a plurality of preliminary look-up tables 122-124 and a preliminary risk rating 126 for each possible combination of outcomes from preliminary look-up tables 122-124. The preliminary risk rating 126 can refer to the risk of being attacked by the threat actors 117 a-e (illustrated in FIGS. 5-7). As such, the cumulative risk can comprise a plurality of threat levels that are different or the same as those utilized in FIGS. 5-7. For example, the threat levels can be "Very High," "High," "Medium," "Low," and "Very Low" ("VH," "H," "M," "L," and "VL," respectively). As stated above, the different threat levels can represent the relative likelihood of being attacked by each of the threat actors 117 a-e (illustrated in FIGS. 5-7).

Accordingly, the scenarios can represent each possible combination of outcomes from questions relating to the organization's industries as well as their headquarters and presence in countries. Along these lines, the scenarios can be utilized to determine the preliminary risk rating 126 for each of the threat actors 117 a-e (illustrated in FIGS. 5-7) based on the questions. As such, for example, if the outcomes from preliminary look-up tables 122-124 for "Organized Crime" 117 a (illustrated in FIGS. 5-7) is "Medium," "1," and "0,"

respectively, scenario #1 would call for the cumulative risk rating to be "Medium." Alternatively, if the outcomes from preliminary look-up tables 122-124 for "Hacktivists" 117 *b* (illustrated in FIGS. 5-7) is "Low," "2," and "0," respectively, scenario #4 would call for the cumulative risk rating to be "Low."

Referring back to FIG. 3, as stated previously, based on receiving answers to questions provided to a user, the inherent risk assessment 114 can determine the cumulative risk ratings 118 *a-e* for each of the threat actors 117 *a-e*. Thereafter, based on the risk ratings 118 *a-e* of the threat actors 117 *a-e*, the inherent risk assessment 114 can determine the risk ratings 112 *a-c* for each of the threat vectors 110 *a-c*. The risk ratings 112 *a-c* for each of the threat vectors 110 *a-c* can be based on a likelihood of the threat actors 117 *a-e* employing the threat vectors 110 *a-c*, and optionally, a legal regime of one or more countries which the organization is present, which will be described in more detail below.

Figure 9:
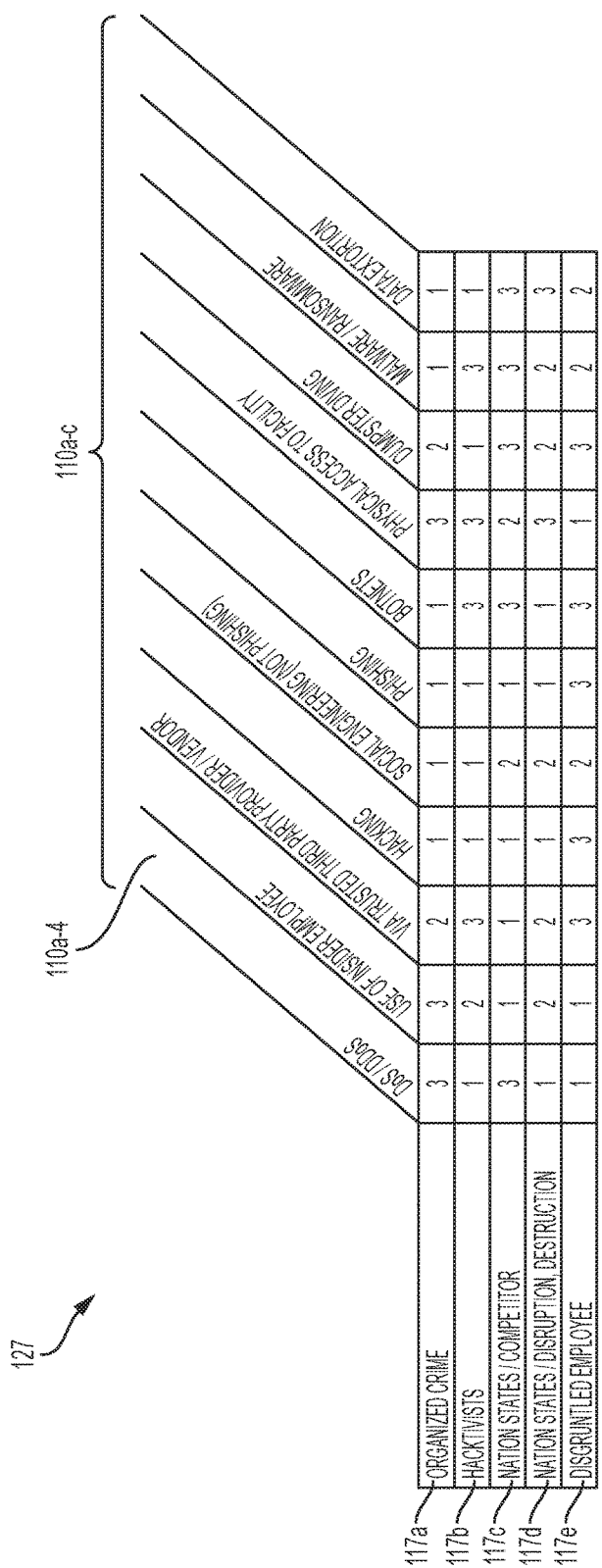

To determine the likelihood of the threat actors 117 *a-e* employing the threat vectors 110 *a-c*, a threat look-up table can be utilized. Referring now to FIG. 9, an exemplary threat look-up table 127 is provided. The threat look-up table 127 can comprise a likelihood that each of the threat actors 117 *a-e* employ each of the threat vectors 110 *a-c*. The likelihood can be one of a plurality of levels, such as "1," "2," and "3" As such, the level of likelihood can refer to whether the threat actors 117 *a-e* are likely to utilize the threat vectors 110 *a-c* as a primary method, secondary method, or tertiary method. For example, as illustrated, the threat actor 117 *a*—"Organized Crime"—utilizes the threat vector 110 *a*-4—"DoS/DDoS"—as a tertiary method and, thus, is assigned the level "3." The threat actor 117 *b*—"Hacktivists"—utilizes the threat vector 110 *a*-4—"DoS/DDoS"—as a primary method and, thus, is assigned the level "1." The threat actor 117 *c*—"Nation States/Competitor"—utilizes the threat vector 110 *a*-4—"DoS/DDoS"—as a tertiary method and, thus, is assigned the level "3." The threat actor 117 *d*—"Nation States/Disruption, Destruction"—utilizes the threat vector 110 *a*-4—"DoS/DDoS"—as a primary method and, thus, is assigned the level "1." The threat actor 117 *e*—"Disgruntled Employee"—utilizes the threat vector 110 *a*-4—"DoS/DDoS"—as a primary method and, thus, is assigned the level "1."

As such, the likelihood of the threat actors 117 *a-e* utilizing the threat vector "DoS/DDoS" can provide a discount to the risk rating 118 *a-e* (illustrated in FIG. 3) of the threat actors 117 *a-c*. The discount can refer to a decrease in the preliminary risk rating of the threat actors 117 *a-c*. The amount of the decrease can correspond to the level of likelihood of the threat actors 117 *a-e* employing the threat vectors 110 *a-c*. For example, the level "3" can decrease preliminary risk rating two levels, the level "2" can decrease the preliminary risk rating one level, and the level "1" cannot decrease the preliminary risk rating.

Figure 10:
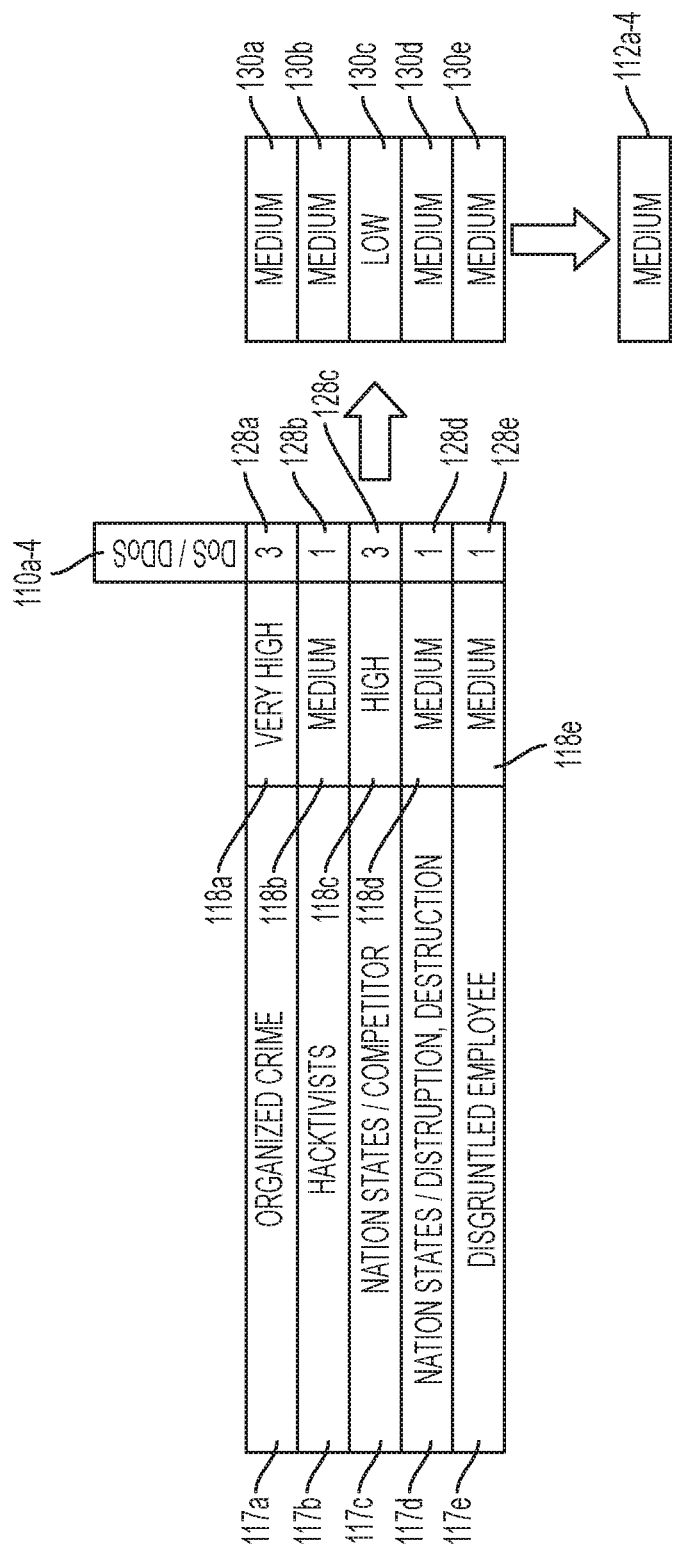
FIGS. 10 and 11 illustrate exemplary processes for determining a risk rating for a threat source based on a risk rating of one or more threat actors against an organization for an inherent risk profile of the organization in accordance with embodiments of the invention.

Upon acquiring the likelihood of the threat actors 117 *a-e* employing a particular one of the threat vectors 110 *a-c*, the inherent risk assessment 114 (illustrated in FIG. 3) can determine a risk rating for one of the threat vector 110 *a-c* (depicted in FIG. 3). Referring now to FIG. 10, an exemplary method to determine a risk rating 112 *a*-4 for a particular threat vector 110 *a*-4 is depicted. The inherent risk assessment can correlate the cumulative risk ratings 118 *a-e* of the threat actors 117 *a-e* to a likelihood 128 *a-e* of the threat actors 117 *a-e* employing the threat vector 110 *a*-4. In doing so, the inherent risk assessment can determine if any of the cumulative risk ratings 118 *a-e* of the threat actors 117 *a-e* should be discounted for the threat actor 110 *a*-4, as discussed previously. Thereafter, the inherent risk assessment can provide an ultimate risk rating 130 *a-e* for the threat actors 117 *a-e* that is based on a likelihood 128 of the threat actors 117 *a-e* employing the threat vectors 110 *a-c*.

For example, as illustrated, the threat actor 117 *a*—"Organized Crime"—can have cumulative risk rating 118 *a*—"Very High"—and level of likelihood 128 *a*—"3"—for utilizing the threat vector 110 *a*-4—"DoS/DDoS," the threat actor 117 *b*—"Hacktivists"—can have cumulative risk rating 118 *b*—"Medium"—and level of likelihood 128 *b*—"1"—for utilizing the threat vector 110 *a*-4—"DoS/DDoS," the threat actor 117 *c*—"Nation States/Competitor"—can have cumulative risk rating of 118 *c*—"High"—and level of likelihood 128 *c*—"3"—for utilizing the threat vector 110 *a*-4—"DoS/DDoS," the threat actor 117 *c*—"Nation States/Disruption, Destruction"—can have cumulative risk rating of 118 *d*—"Medium"—and level of likelihood 128 *d*—"1"—for utilizing the threat vector 110 *a*-4—"DoS/DDoS," and the threat actor 117 *e*—"Disgruntled Employee"—can have cumulative risk rating 118 *e*—"Medium"—and a level of likelihood 128 *e*—"1"—for utilizing the threat vector 110 *a*-4—"DoS/DDoS."

As such, the cumulative risk rating 118 *a* for the threat actor 117 *a*—"Organized Crime"—can decrease 2 levels, and the ultimate risk rating 130 *a* for the threat actor 117 *a*—"Organized Crime"—can be "Medium." The cumulative risk rating 118 *b* for the threat actor 117 *b*—"Hacktivists"—can remain the same, and the ultimate risk rating 130 *b* for the threat actor 117 *b* "Hacktivists"—can be "Medium." The cumulative risk rating 118 *b* for the threat actor 117 *c*—"Nation States/Competitor"—can decrease 2 levels, and the ultimate risk rating 130 *c* for the threat actor 117 *c*—"Nation States/Competitor" can be "Low." The cumulative risk rating 118 *d* of the threat actor 117 *d*—"Nation States/Disruption, Destruction"—can remain the same, and the ultimate risk rating 130 *d* for the threat actor 117 *d*—"Nation States/Disruption, Destruction"—can be "Medium." The cumulative risk rating 118 *e* of the threat actor 117 *e*—"Disgruntled Employee"—can decrease 2 levels, and the ultimate risk rating 130 *d* for the threat actor 117 *e*—"Disgruntled Employee"—can be "Medium."

Therefore, upon determining the ultimate risk ratings 130 *a-e* for the threat actors 117 *a-e*, a risk rating 112 *a*-4 for the threat vector 110 *a*-4 can be determined. The risk rating 112 *a*-4 for the threat vector 110 *a*-4 can be the worst of the ultimate risk ratings 130 *a-e*. For example, as illustrated and stated previously, the ultimate risk rating 130 *a* for the threat vector 117 *a*—"Organized Crime"—to use the threat vector 110 *a*-4—"DoS/DDoS"—can be "Medium," the ultimate risk rating 130 *b* for the threat vector 117 *a*—"Hacktivists"—to use the threat vector 110 *a*-4—"DoS/DDoS"—can be "Medium," the ultimate risk rating 130 *c* for the threat vector 117 *c*—"Nation States/Competitor"—to use the threat vector 110 *a*-4—"DoS/DDoS"—can be "Low," the ultimate risk rating 130*d* for the threat actor 117 *d*—"Nation States/Disruption, Destruction"—to use the threat vector 110 *a*-4—"DoS/DDoS"—can be "Medium," and the ultimate risk rating 130 *e* for the threat actor 117 *e*—"Disgruntled Employee"—to use the threat vector 110 *a*-4—"DoS/DDoS"—can be "Medium." As such, the risk rating 112 *a*-4 for the threat vector 110 *a*-4—"DoS/DDoS" can be "Medium."

Referring back to FIG. 3, the inherent risk assessment 114 can determine the risk ratings 112 *a-c* for each of the threat vectors 110 *a-c* based on the processes described in FIGS. 9 and 10. Moreover, the inherent risk assessment 114 can adjust the risk ratings 112 *a-c* of one or more of the threat vectors 110 *a-c* based on a legal regime of the organization's presence countries in governing the threat vectors 110 *a-c*. "Legal regime" can refer to legal consideration affecting the user of cyber-attack methods, such as the ability of a host country to seize data/systems without recourse or due process, or laws prohibiting the use of encryption technology or preventing cloud storage or computing. According to an embodiment, the inherent risk assessment 114 can only alter the risk ratings for only the threat vector 110 *b-1*—"User of insider Employee"—and threat vector 110*b-2*—"Via Trusted Third Party Provider/Vendor."

Figure 11:
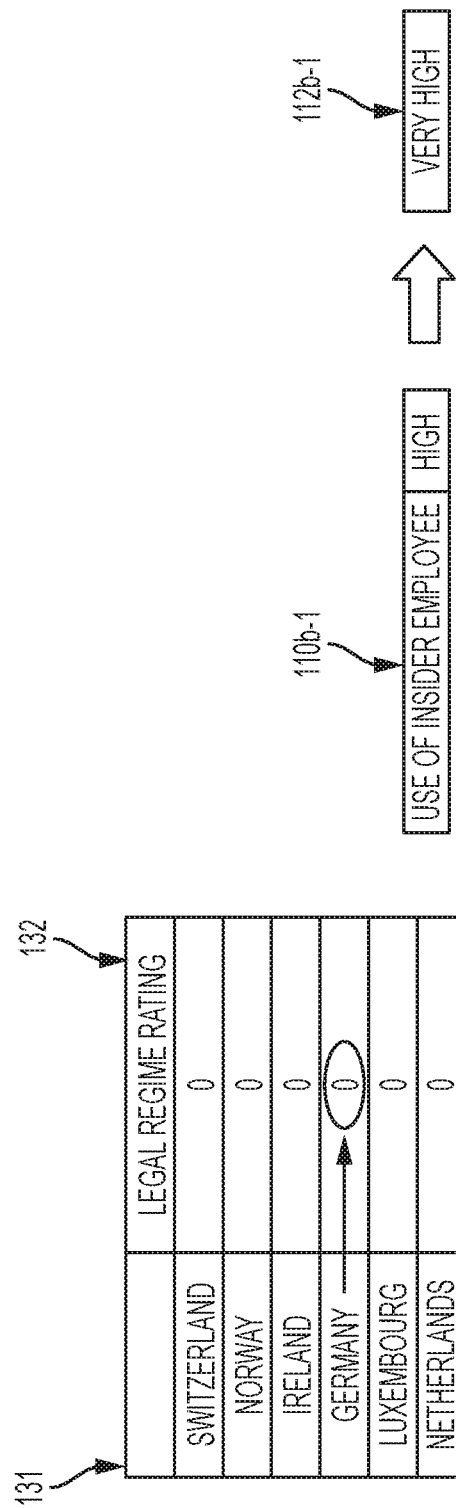

To determine if the risk rating for one of the treat types 110 *a-c* should be modified based on the legal regime in the organization's presence countries, the inherent risk assessment 114 can utilize a separate look-up table than those previously discussed. Referring now to FIG. 11, a portion 131 of the look-up table is provided. The look-up table can comprise each possible counts the organization is present and a legal regime rating 132 relating to the legal regime in each country is provided. The legal regime rating 132 can comprise one of a plurality of levels that are different or the same as those utilized in FIGS. 5-7. For example, the levels can comprise 0, 1, or 2. The levels can relate to a strength of the legal regime of the country in protecting the organization from cyber risks. As such, the higher the legal regime rating the weaker the strength of the legal regime of the country. According to an embodiment, the level "0" can refer to a country having a strong legal regime, the level "1" can refer to a country having a moderate legal regime, and the level "2" can refer to a country having a weak legal regime. Therefore, the legal regime rating of "0" does not increase the risk ratings 112 *a-c* of the treat types 110 *a-c*, and the legal regime rating of "1" or "2" increases the risk ratings 112 *a-c* of the threat vectors 110 *a-c* by a single risk rating (e.g., "Medium" to "High").

Consequently, upon the organization being present in multiple countries having different legal regime ratings, the inherent risk assessment can utilize the legal regime rating having the highest level (i.e., the weakest legal regime). For example, as illustrated, although the organization is present in "Germany" and "United States," the inherent risk assessment may only utilize the legal regime rating for the "United States." In doing so, the inherent risk process can increase the risk rating of "the threat vector 110 *b-2*—Use of Insider Employee—from "High" to "Very High."

Referring back to FIG. 2, upon determining the risk ratings 112 *a-c* for each of the threat vectors 110 *a-c*, the inherent risk assessment 114 (illustrated in FIG. 3) can determine the risk ratings 113 *a-c* for each of the threat origins 111 *a-c*. To do so n one embodiment, the risk ratings 113 *a-c* of the threat origins 111 *a-c* can be an average of the risk ratings 112 *a-c* for the threat vectors 110 *a-c*. As such, one or more of the risk ratings 112 *a-c* of the threat vectors 110 *a-c* can be weighted. In another embodiment, one or more look-up tables each relating to one of threat origins 111 *a-c* can be utilized to determine the risk ratings 113 *a-c* of the threat origins 111 *a-c*.

Figure 14:
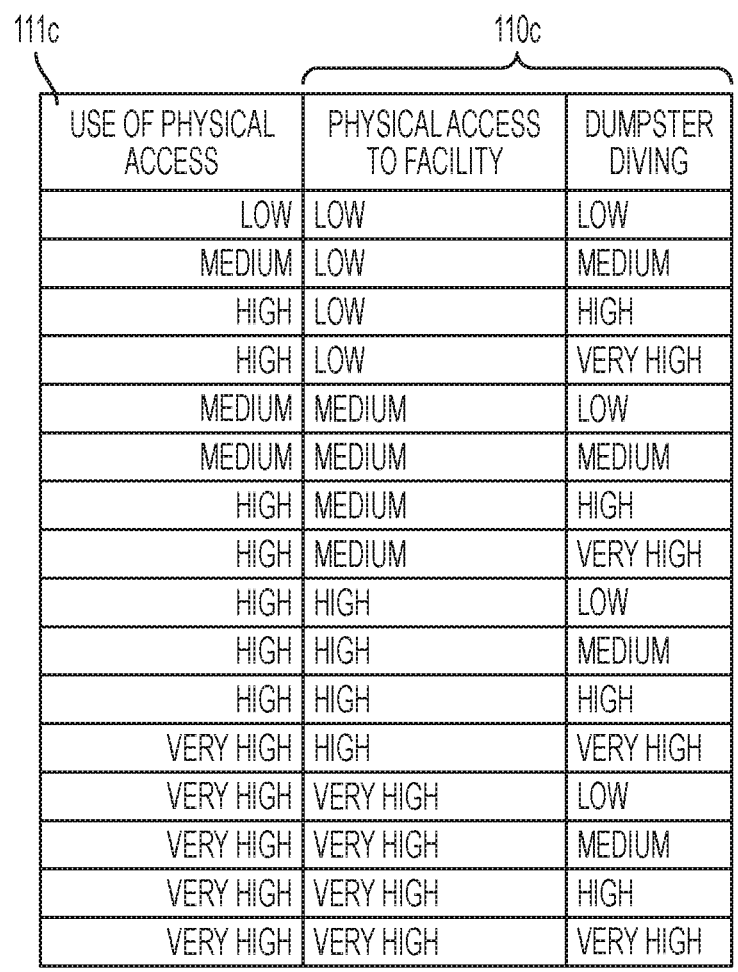

Referring now to FIGS. 12-14 exemplary portions of look-up tables to determine the risk ratings 113 *a-c* of the threat origins 111 *a-c* is provided. Each of the look-up tables can comprises each possible combination of outcomes for the threat vectors of the threat origin and a risk rating for each possible combination of outcomes. For instance, FIG. 12 illustrates an exemplary portion of a look-up table to determine threat origin 111 *a*—"Attack from Outside"—and comprises each possible combination of outcomes for the threat vectors 110 *a* of the threat origin 111 *a* and a risk rating for each possible combination of outcomes. Furthermore, FIG. 13 depicts an exemplary portion of a look-up table to determine the threat origin 111 *b*—"Use of Insiders"—and comprises each possible combination of outcomes for the threat vectors 110 *b* of the threat origin 111 *b* and a risk rating for each possible combination of outcomes. Moreover, FIG. 14 provides an exemplary portion of a look-up table to determine the threat origin 111 *c*—"Use of Physical Access"—and comprises each possible combination of outcomes for the threat vectors 110 *c* of the threat origin 111 *c* and a risk rating for each possible combination of outcomes.

As such, the look-up tables of FIGS. 12 and 13 can implement a set of rules to determine the risk ratings 113 *a, b* of the threat vectors 110 *a, b*. Specifically, the set of rules can comprise using the se second highest (worst) risk rating of the threat vectors, unless one of the risk ratings of the threat vector is lower (better) than another one of the risk rating of the threat vector by at least two risk ratings. If one of the risk ratings of the threat vector is lower (better) than another one of the risk rating of the threat vector by at least two risk ratings, the highest risk rating lowered by one risk rating is selected. For example, as illustrated in FIG. 12, when the threat vectors "DoS/DDoS," "Hacking," "Botnets," and "Malware/Ransomeware" have risk ratings of "Low" "Low" "Medium," and "High," respectively, the risk rating for threat origin "Attack from Outside" is "Medium." Moreover, as also illustrated in FIG. 12, when the threat vectors "DoS/DDoS," "Hacking," "Botnets," and "Malware/Ransomware" have risk ratings of "Low," "Medium." "Low," and "Very High," respectively, the risk rating for threat origin "Attack from Outside" is "High."

Figure 15:
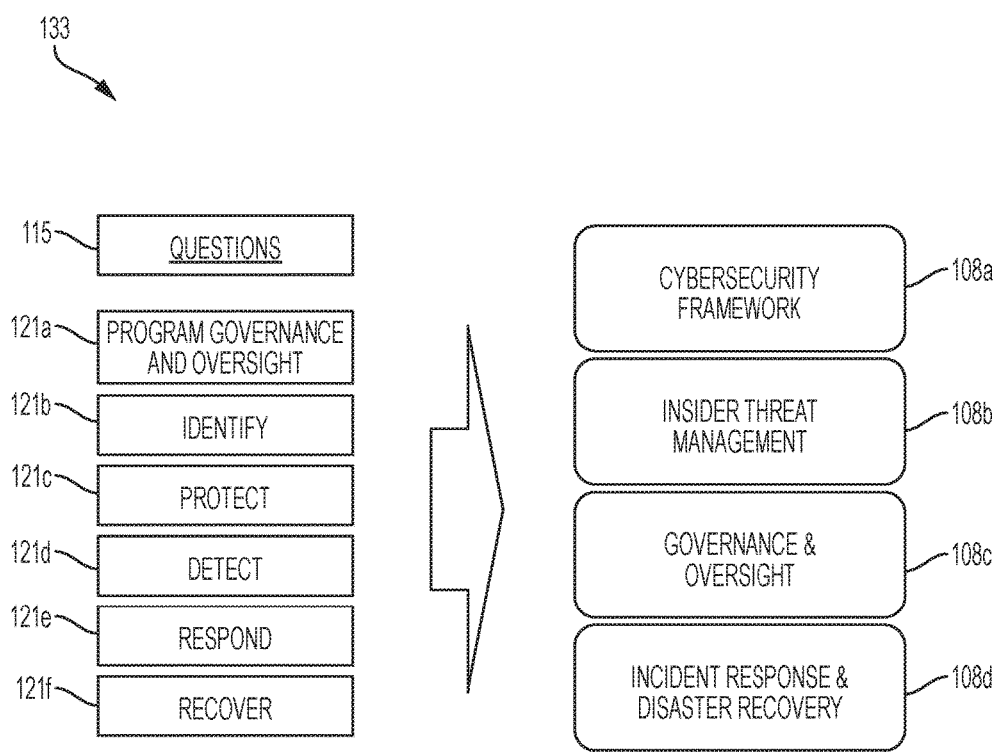
FIG. 15 illustrates an exemplary process for determining a cyber preparedness profile of an organization in accordance with embodiments of the invention.
Figure 17E:
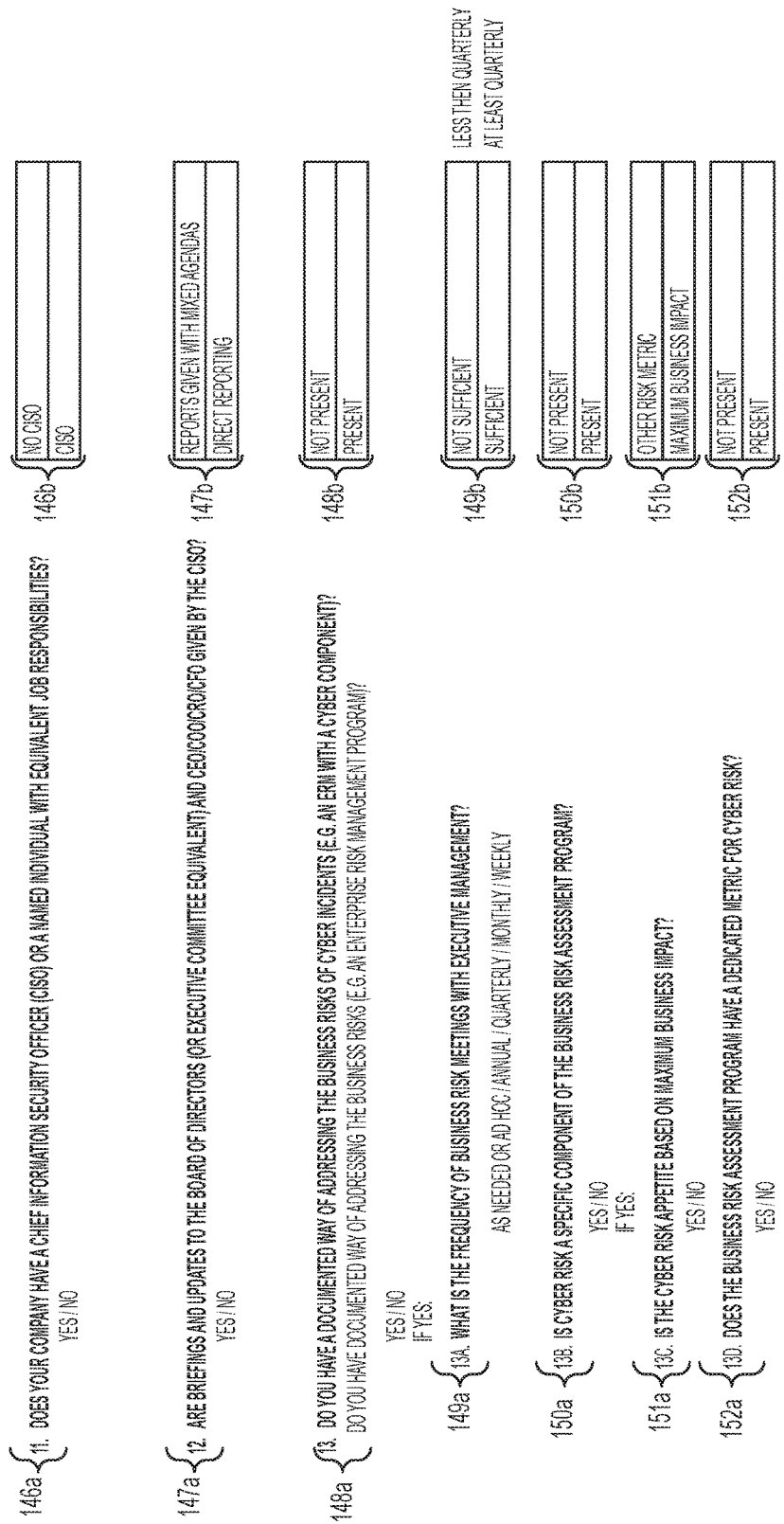
FIGS. 17 A-F illustrate exemplary questions and answers for a user to select in order to determine a cyber preparedness profile of an organization in accordance with embodiments of the present invention.
Figure 17F:
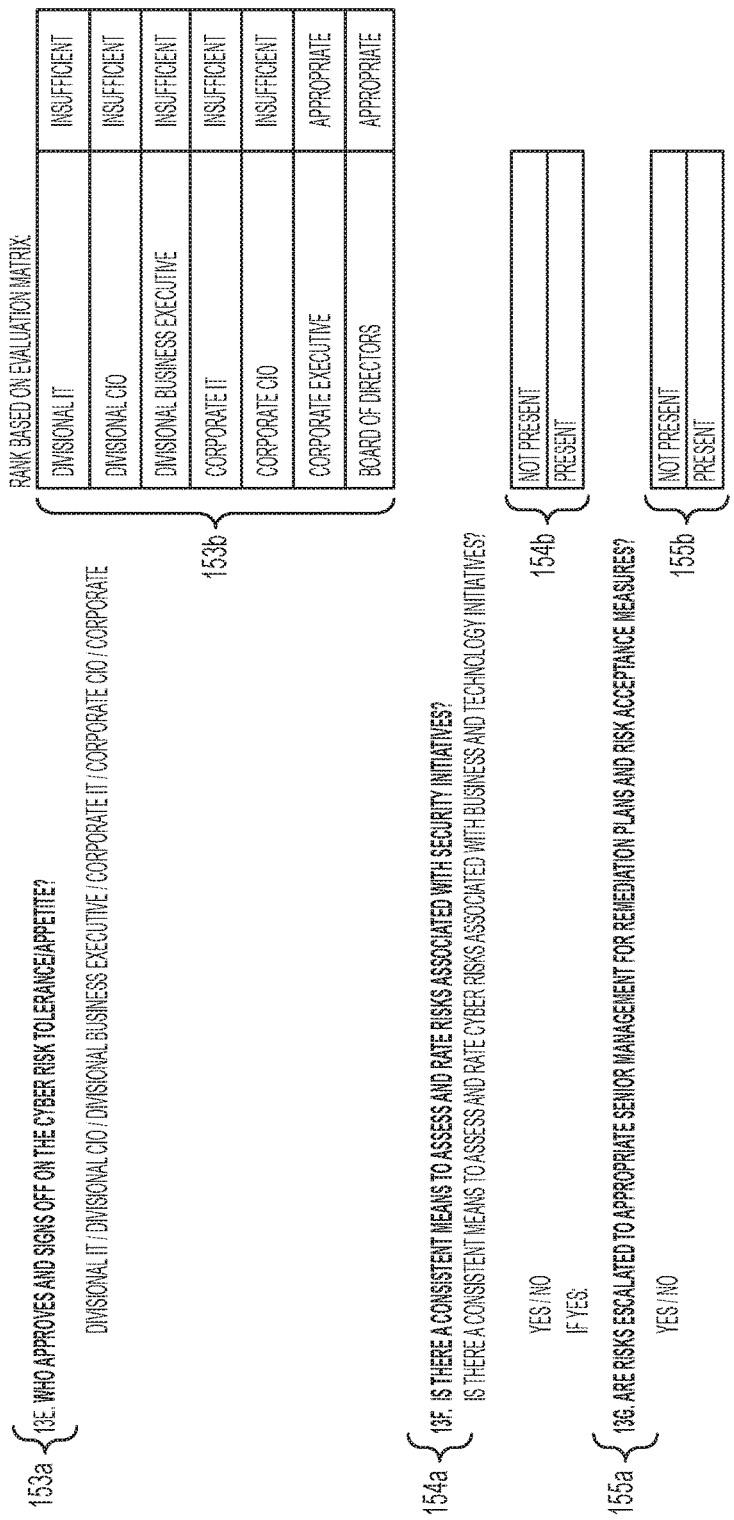

Referring back to FIG. 2, to determine the cyber preparedness profile 106, a cyber-risk assessment may be used. Referring now to FIG. 15, an exemplary cyber preparedness assessment 133 is provided. The cyber preparedness assessment 133 can comprise a plurality of questions 115. As stated previously, the questions can be presented to a user in a plurality of categories. According to an embodiment, the questions are presented to a user in one or more of the "Program Governance and Oversight," "Identify," "Protect," "Detect," "Respond," and "Recover" categories 121 *a-f*. The answers to these questions can be used in the cyber preparedness assessment 133. According to another embodiment, the cyber-risk assessment can comprise 20 to 200 questions. According to yet another embodiment, the cyber-risk assessment can comprise 50 to 150 questions. According to yet a further embodiment, the cyber-risk assessment can comprise approximately 100 questions.

Figure 16:
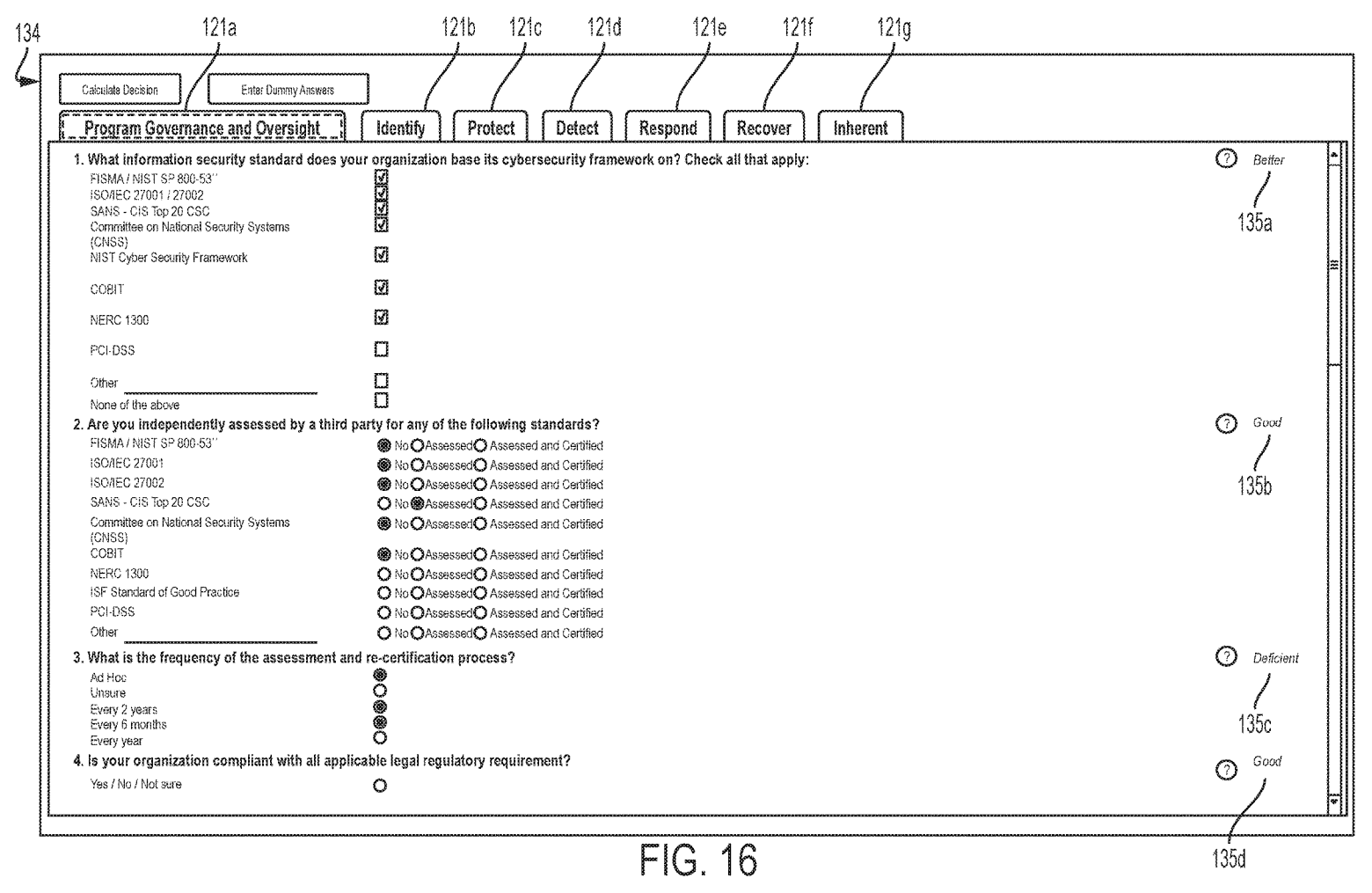

Referring now to FIG. 16, an exemplary user interface 134 related to questions presented in one or more categories 121 *a-f* comprising questions used in the cyber preparedness assessment 133 (illustrated in FIG. 15) is depicted (the questions in category 121 *g* are used in the previously described inherent risk assessment). The user interface 134 comprises a plurality of questions and one or more predefined answers for selection by a user. Upon selection of one or more answers, a preliminary strength rating 135 *a-d* relating to each question can be determined. The preliminary strength ratings 135 *a-d* of the question can refer to a likelihood of protecting one or more organizational resources from one or more cyber-attacks, and can comprise a plurality of levels. For instance, the preliminary strength rating 135 *a-d* can be "Better," "Good," "Acceptable," "Deficient," or "TBD." Although illustrated in FIG. 16, the user interface 134 can be configured to not include the preliminary strength ratings 135 *a-e*. Along these lines, the questions can each correspond to a recommendation for receiving an optimal preliminary strength rating (e.g., "Better" or "Good"), educational information relating to the importance of the question, and/or one or more risks associated with not receiving the optimal preliminary strength rating; each of which may or may not be presented on the user interface 134.

Referring now to FIGS. 17A-F, a plurality of objective questions for the "Program Governance and Oversight" category 121 *a* is depicted. As discussed above, one or more questions 135 *a*, 136 *a*, 138 *a*-155 *a* can have one or more predefined answers for a user to select. The questions can be answered, for example, using drop down menus, radio buttons, check boxes, or the like. Although some questions 135 *a*, 136 *a*, 138 *a*, 139 *a*, and 141 *a*-155 *a* having one or more predefined answers can be used in the cyber-risk assessment, other questions 140 *a* having one or more predefined answers can be for informational purposes only and not used in the cyber-risk assessment. Moreover, one or more questions 137 *a* can prompt a free-form answer and, thus, be for only informational purposes 137 *b* and not used in the cyber-risk assessment.

As such, one or more questions having one or more pre-defined answers can each be associated with a look-up table 135 *b*, 136 *b*, 138 *b*-155 *b*. The look-up table 135 *b*, 136 *b*, 138 *b*-155 *b* can comprise each possible answer or combination of answers a user may select for the question and a preliminary strength rating. The preliminary strength rating can be one of a plurality of strength levels and, thus, can be the same or different for each of the look-up tables 135 *b*, 136 *b*, 138 *b*-155 *b*. According to an embodiment, as illustrated for question (1), if the user indicates the organization uses more than one information security standard, the preliminary strength rating is "Good." According to another embodiment, as illustrated for question (8), if the user indicates "5-10%" or "10-15%" of the overall Information Technology budget is dedicated to cyber security, the preliminary strength rating is "Average."

Referring back to FIG. 15, one or more questions 115 from one or more categories 121 *a-f* can correspond to one or more evaluation categories 108 *a-d*. As such, the strength rating of each of the evaluation categories 108 *a-d* can be based on one or more questions 115. To determine the strength rating of the evaluation categories 108 *a-d*, a data structure can be implemented.

As to evaluation category 108*e* (not illustrated), a user can assess one or more physical locations of the organization to determine if the location meets one or more predetermined capabilities relating to deterring one or more physical acts that may result in a cyber-attack. The assessment can be performed manually by the user, and can be inputted into the computer. The results of the assessment can provide a strength rating of the evaluation category 108*e*. As such, the results can be determined by the user and inputted into the computer, or can determined by the computer. Along these lines, the results can be determined by the computer via using a look-up table.

Figure 18:
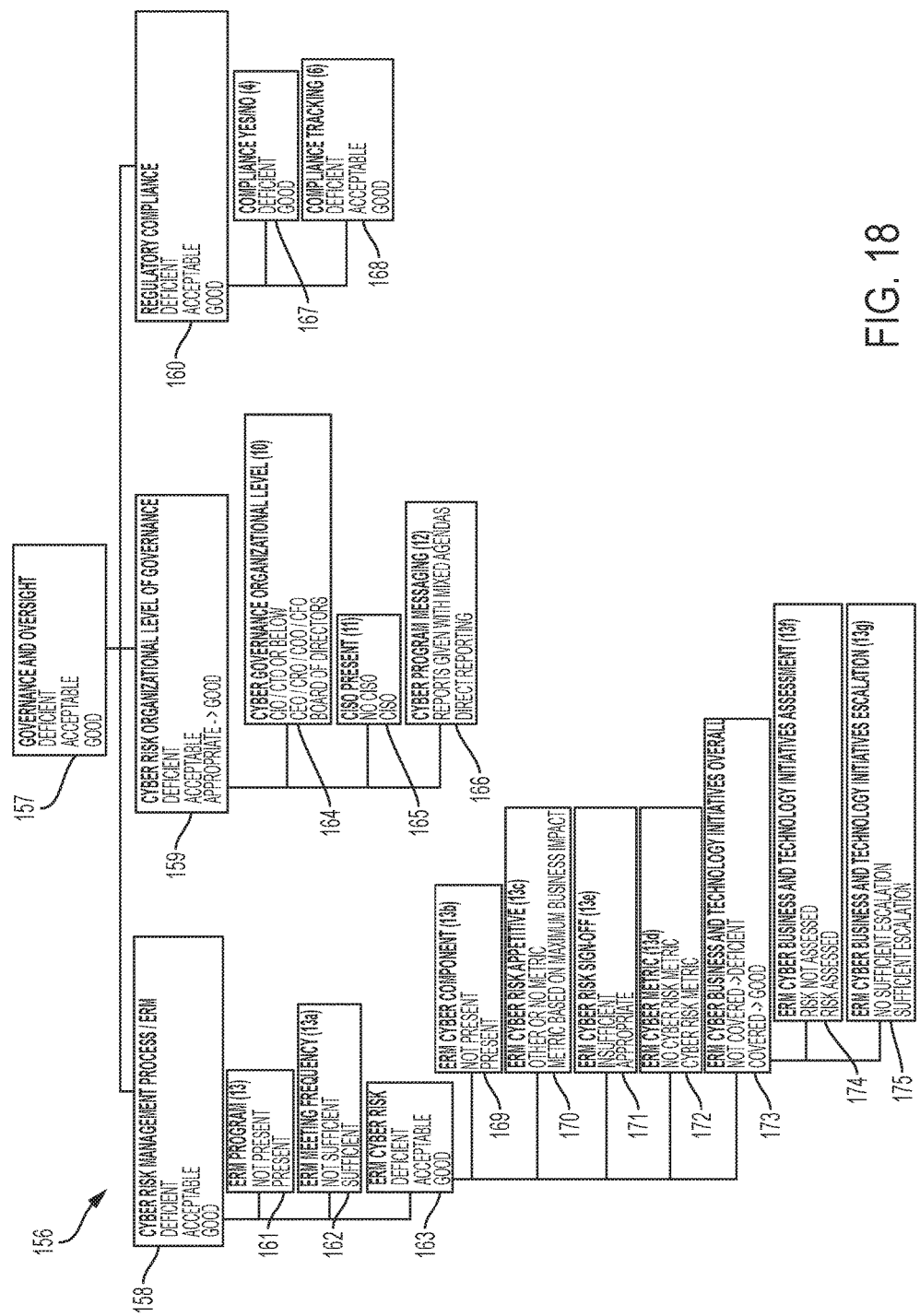
FIG. 18 illustrates an exemplary data structure to determine a strength rating for an organizational safeguard of a cyber preparedness profile of an organization in accordance with embodiments of the present invention.

Referring now to FIG. 18, an exemplary data structure 156 for determining a strength rating of organizational safeguard 108 *a-d* (illustrated in FIG. 15) is provided. The data structure 156 can comprise a plurality of levels that each comprise one or more independent or dependent nodes. The independent nodes can correspond to a question from one of the categories 121 *a-f* (depicted in FIG. 15). Along these lines, the independent nodes of the data structure can comprise questions belonging the same or different categories 121 *a-f* (depicted in FIG. 15).

As such, the data structure 156 can comprise a first level node 157 that corresponds to an organizational safeguard (i.e., Governance and Oversight). The root node 157 can depend on one or more second level nodes 158-160. The second level nodes 158-160 can correspond to one or more internal processes of the organization to deter a cyber-attack. As illustrated, the second level nodes 158-160 can each be internal nodes and depend on a plurality of third level nodes. Alternatively, although not illustrated, the second level nodes 158-160 can be external nodes and each correspond to a question of one or more categories 121 *a-f* (depicted in FIG. 15).

As such, the third level nodes 161-168 can be internal nodes or external nodes. The third level, external nodes 161, 162, 164-168 can each correspond to a question of the same category of upper echelon nodes. For example, as illustrated, node 161 corresponds to question 13, node 162 corresponds to question 13*a*, node 164 corresponds to question 10, node 165 corresponds to question 11, node 166 corresponds to question 12, node 167 corresponds to question 4, and node 168 corresponds to question 6.

Moreover, the third level, internal node 163 can depend on a plurality of fourth level nodes 169-173. The fourth level nodes 169-173 can each be internal nodes or external nodes. The fourth level, external nodes 169-173 can each correspond to a question. For example, as illustrated, node 169 corresponds to question 13*b*, node 170 corresponds to question 13*c*, node 171 corresponds to 13*e*, and node 172 corresponds to question 13*d*. The fourth level, internal node 173 can depend on a plurality of fifth level, external nodes 174, 175, each of which can correspond to a question of the same category as upper echelon nodes. For example, as illustrated, node 174 corresponds to question 13*f*, and node 175 corresponds to question 13*g*.

Along these lines, the questions corresponding to the nodes can be presented to a user in different categories 121 *a-f* (depicted in FIG. 15). As such, although not illustrated, questions from category 121 *a*—"Program Governance and Oversight"—and category 121 *d*—"Detect"—(illustrated in FIG. 15) can correspond to the organizational safeguard 108 *c*—"Governance & Oversight" (shown in FIG. 2). In doing so, the cyber preparedness assessment can correlate a question from category 121 *a*—"Program Governance and Oversight"—and category 121 *d*—"Detect"—(illustrated in FIG. 15) to nodes of a data structure for the organizational safeguard 108 *c*—"Governance & Oversight" (shown in FIG. 2).

To determine a strength factor of the organizational safeguard (i.e., Governance and Oversight), external nodes utilize the look-up tables of the questions associated therewith, as discussed in detail above. Moreover, internal nodes each utilize a look-up table comprising each possible outcome or combination of preliminary strength ratings for the question(s) corresponding to external, child nodes and a cumulative strength rating for each possible combination of preliminary strength ratings. The cumulative strength rating can comprise a plurality of levels that are the same or different than the levels of the preliminary strength ratings relating to at least one of the questions.

As such, still referring to FIG. 18, the root node 157 (i.e., Governance and Oversight) can utilize a look-up table comprising each possible combination of strength ratings of questions corresponding to the second level, internal nodes 158-160 and a cumulative strength rating for each possible combination of strength ratings. The second level, internal nodes 158-160 can each utilize a look-up table comprising each possible combination of strength ratings of questions corresponding to third level, external nodes 161, 162, 164-168, and optionally a third level, internal node 163, and a cumulative strength rating for each possible combination of strength ratings. The third level, internal node 163 can utilize a look-up table comprising each possible combination of strength ratings of questions corresponding to fourth level, external nodes 169-172, and optionally a fourth level, internal node 173, and a cumulative strength rating for each possible combination of strength ratings. The fourth level, internal node 173 can utilize a look-up table comprising each possible combination of strength ratings of questions corresponding to fifth level, external nodes 174, 175 and a cumulative strength rating for each possible combination of strength ratings.

Figure 19:
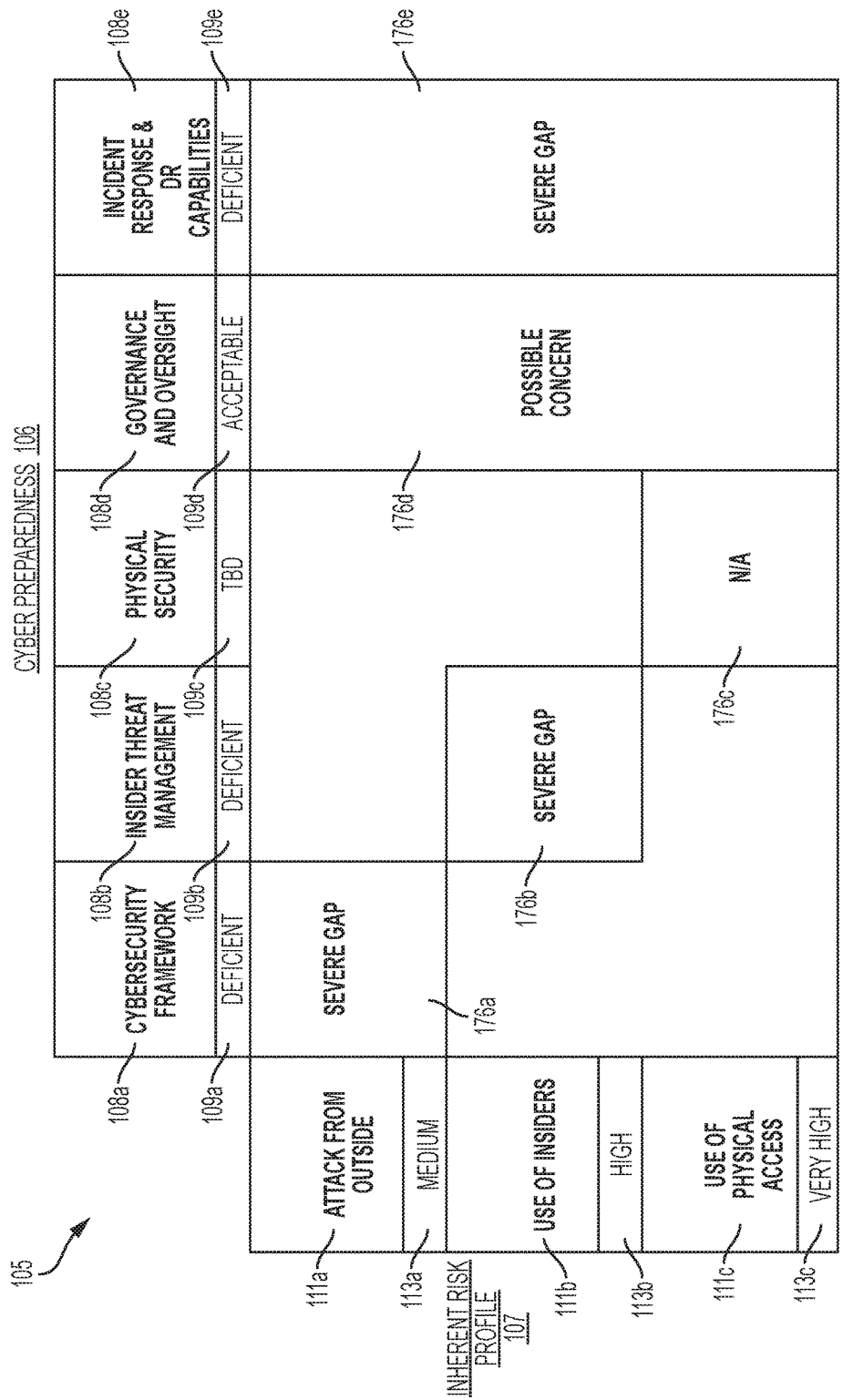
FIG. 19 illustrates an exemplary cyber readiness profile of an organization in accordance with embodiments of the present invention.

Upon performing an inherent risk assessment 114 (illustrated in FIG. 3) and a cyber preparedness assessment 133 (illustrated in FIG. 15), a cyber readiness profile is provided to a user. Referring now to FIG. 19, another exemplary cyber readiness profile 105 of the organization is illustrated. The cyber readiness profile 105 comprises an inherent risk profile 107 of the organization from one or more cyber-attack, and a cyber preparedness profile 106 of the organization against the cyber-attacks. As stated previously, the cyber preparedness profile 106 comprises one or more evaluation categories 108 $a$-$e$ and a strength rating 109 $a$-$e$ for each of the evaluation categories 108 $a$-$e$, and the inherent risk profile 107 can comprise one or more threat origins 111 $a$-$c$ and a risk rating 113 $a$-$c$ for each of the threat origins 111 $a$-$c$.

Along these lines, the cyber readiness profile 105 can compare the strength ratings 109 $a$-$e$ of the evaluation categories 108 $a$-$e$ to the risk ratings 113 $a$-$c$ of the threat types 110 $a$-$c$. In doing so, the cyber readiness profile 105 can present one or more relationships 176 $a$-$e$ between one or more organizational safeguards 108 $a$-$e$ and one or more threat origins 111 $a$-$c$. The relationships 176 $a$-$e$ between the organizational safeguards 108 $a$-$e$ and the threat origins 111 $a$-$c$ can depend on one or more attack types of the threat origins 111 $a$-$c$ for employing a cyber-attack, and on one or more defense mechanisms of the organizational safeguards 108 $a$-$e$ in defending against the attack type. As such, for there to be a relationship between one or more threat origins 111 $a$-$c$ and one or more one or more organizational safeguards 108 $a$-$e$, the defense mechanism of the organizational safeguards 108 $a$-$e$ may have to be configured to defend against the attack employed by the threat origins 111 $a$-$c$.

According to an embodiment, the cyber readiness profile 105 can present a relationship 176 $a$-$c$ between one of the evaluation categories 108 $a$-$c$ and one of the threat origins 111 $a$-$c$. For instance, the threat origin 111 $a$—"Attack from Outside"—can comprise an attack through the internet (such as hacking), and the organizational safeguard 108 $a$—"Cybersecurity Framework"—can comprise one or more defense mechanisms to defend against such a cyber-attack. Therefore, the cyber readiness profile 105 can present the relationship 176 $a$ between the organizational safeguards 108 $a$—"Cybersecurity Framework"—and the threat origin 111 $a$—"Attack from Outside." Moreover, the threat origin 111 $b$—"Use Insiders"—can comprise an attack involving legitimate access given to an individual inside, or related to, the organization, and the organizational safeguard 108 $b$—"Insider Threat Management"—can comprise one or more defense mechanisms to defend against access given to such an individual. Accordingly, the cyber readiness profile 105 can present the relationship 176 $b$ between the organizational safeguard 108 $b$—"Insider Threat Management"—and the threat origin 111 $b$—"Use Insiders." Furthermore, the threat origin 111 $c$—"Use of Physical Access"—can employ an attack through an individual outside of an organization who acquires unauthorized access to an organizational resource by gaining access to the organization's physical facilities or property, and the organizational safeguard 108 $c$—"Physical Security"—can comprises one or more defense mechanisms to ensure protection against such an individual. Therefore, the cyber readiness profile 105 can present the relationship 176 $c$ between the organizational safeguards 108 $c$—"Physical Security"—and the threat origin 111 $c$—"Use of Physical Access."

According to another embodiment, the cyber readiness profile 105 can present a relationship 176 $d$-$e$ between one of the evaluation safeguards 108 $d$-$e$ and a plurality of the threat origins 111 $a$-$c$. To do so, the evaluation safeguards 108 $d$-$e$ can have generic capabilities and, thus, correspond to a plurality of threat origins 111 $a$-$c$. Specifically, the evaluation safeguard 108 $d$—"Governance and Oversight"—can be directed to assessing corporate culture for protecting against a likelihood of an occurrence of an attack by the threat origins 111 $a$-$c$. Moreover, the evaluation category 108 $e$—"Incident Response & DR Capabilities" can be directed to assessing readiness of an organization in responding to an attack by the threat origins 111 $a$-$c$. As such, the cyber readiness profile 105 can present a relationship 176 $d$ between the organizational safeguards 108 $d$—"Governance and Oversight"—and the threat origin 111 $a$-$c$—"Attack from Outside," "Use of Insiders," and "Use of Physical Access." Along these lines, the cyber readiness profile 105 can present a relationship 176 $e$ between the organizational safeguards 108 $e$—"Incident Response & DR Capabilities"—and the threat origin 111 $a$-$c$—"Attack from Outside," "Use of Insiders," and "Use of Physical Access."

By doing so, the relationships 176 $a$-$e$ can illustrate a cyber readiness of each of the evaluation categories 108 $a$-$e$ against each of the threat origins 111 $a$-$c$. To illustrate the extent of cyber readiness of the organization, the relationships 176 $a$-$e$ can comprise a plurality of degrees.

The degrees can be presented to a user in the form of text and/or color. According to an embodiment, the degrees can be presented to a user as "Severe Gap," "Possible Concern," "OK," and "N/A." According to another embodiment, the relationships 176 $a$-$e$ can be presented to a user as green, yellow, red, or gray. The color green can represent "OK," the color yellow can represent "Possible Concern," the color red can represent "Severe Gap," and the color gray can represent "N/A."

Moreover, to determine the relationships 176 $a$-$e$ between the organizational safeguards 108 $a$-$e$ and the threat origins 111 $a$-$c$, one or more look-up tables can be utilized. Referring now to FIG. 20, an exemplary look-up table 177 to determine the relationships 176 $a$-$c$ between the organizational safeguards 108 $a$-$c$ and the threat origins 111 $a$-$c$ is depicted. The look-up table 177 can comprise a relationship for each possible combination of strength ratings 178 $a$-$d$ and risk ratings 179 $a$-$e$. As such, referring back to FIG. 19, the cyber readiness profile 105 can utilize that the look-up table 177 (illustrated in FIG. 20) to determine the relationship 176 $a$—"Severe Gap"—between the risk rating 113 $a$—"Medium"—of threat origin 111 $a$—"Attack from Outside"—and the strength rating 109 $a$—"Deficient"—of the evaluation category 108 $a$—"Cybersecurity Framework," the relationship 176 $b$—"Severe Gap"—between the risk rating 113 $b$—"Medium"—of threat origin 111 $b$—"Use of Insiders" and the strength rating 109 $b$-"Deficient"—of the evaluation category 108 *b*—"Insider Threat Management," and the relationship 176 *c*—"N/A"—between the risk rating 113 *c*—"Medium"—of threat origin 111 *c*—"Use of Physical Access"—and the strength rating 109 *c*—"TBD"—of the evaluation category 108 *c*—"Physical security."

Figure 21:

Referring now to FIG. 21, an exemplary look-up table 194 to determine the relationships 176 *d-e* between the organizational safeguards 108 *d-e* and the threat origins 111 *a-c* is depicted. The look-up table 194 can comprise a relationship for each possible combination of strength ratings 178 *a-c* and risk ratings 179 *a-e*. As such, referring back to FIG. 19, the cyber readiness profile 105 can utilize that the look-up table 194 (illustrated in FIG. 21) to determine the relationship 176 *d*—"Possible Concern"—between the risk ratings 113 *a-c*—"Medium"—of threat origins 111 *a-c*—"Attack from Outside," "Use of Insiders," and "Use of Physical Access—and the strength rating 109 *d*—"Acceptable"—of the evaluation category 108 *d*—"Governance and Oversight." Along these lines, the cyber readiness profile 105 can utilize that the look-up table 194 (illustrated in FIG. 21) to determine and the relationship 176 *e*—"Severe Gap"—between the risk ratings 113 *a-c*—"Medium"—of threat origins 111 *a-c*—"Attack from Outside," "Use of Insiders," and "Use of Physical Access—and the strength rating 109 *e*—"Deficient"—of the evaluation category 108 *e*—"Incident Response & DR Capabilities."

Figure 22:
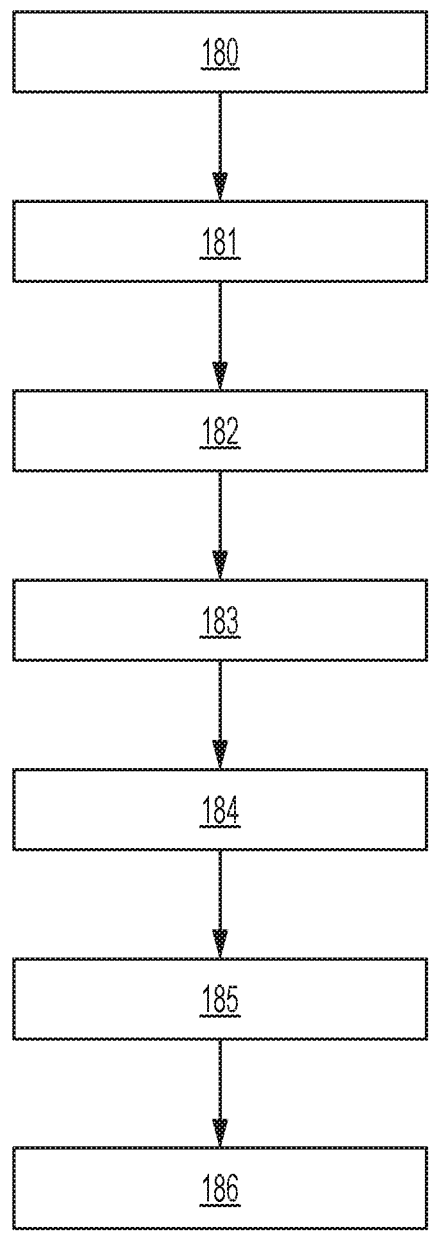
FIG. 22 illustrates an exemplary method of determining a cyber readiness profile of an organization in accordance with embodiments of the present invention.

Referring now to FIG. 22, an exemplary method for evaluating a cyber readiness of an organization is provided. First, at block 180, a plurality of questions are presented to a user at a computer. Some or all of the questions have one or more predefined answers to be selected by the user. Thereafter, at block 181, a plurality of answers to the questions are received from the user by the computer. Based on the answers, at block 182, a risk rating for a threat origin of a cyber-attack from one or more threat actors and/or threat vectors is used to an inherent risk profile at the computer. At block 183, a strength rating for one or more organizational safeguards against cyber-attack is used to determine a cyber preparedness profile at the computer. Subsequently, at block 184, the inherent risk profile of the threat origin is compared to the cyber preparedness profile of the organization and, at block 185, a cyber readiness of the organization from the cyber-attack by each threat origin is determined. Lastly, at block 186, the cyber readiness of the organizational safeguard is displayed. Each of the aforementioned steps can be performed in accordance with embodiments of the invention as described above.

Figure 23:
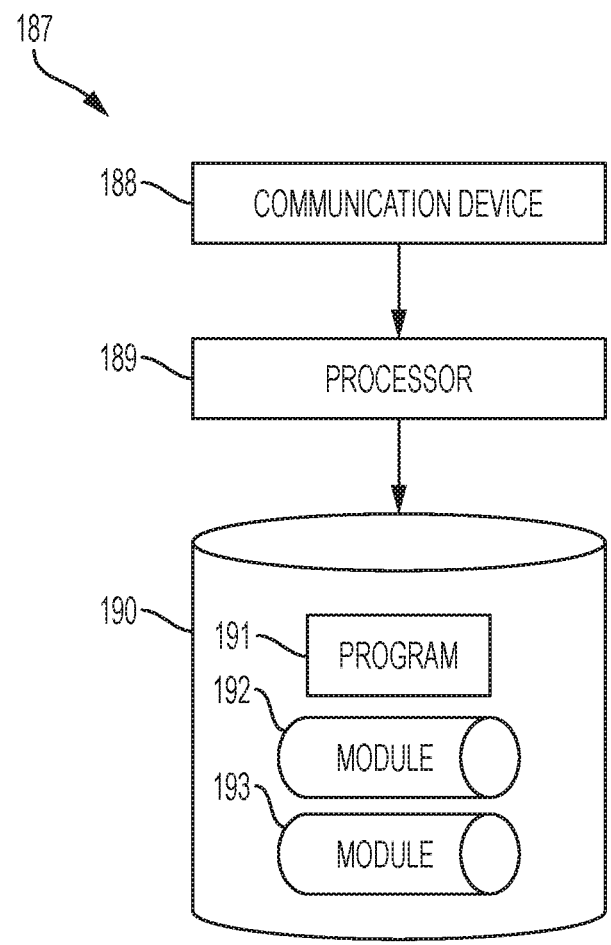
FIG. 23 illustrates a schematic diagram of an exemplary server that can be utilized in accordance with embodiments of the present invention.

Referring now to FIG. 23, a schematic diagram of an exemplary server 187 that may be utilized in accordance with the present invention is illustrated. The exemplary server 187 includes a communication device 188, a processor 189, and a data storage or memory component 190. The processor 189 is in communication with both the communication device 188 and the memory component 190. The communication device 188 may be configured to communicate information via a communication channel, wired or wireless, to electronically transmit and receive digital data related to the functions discussed herein. The communication device 188 may also be used to communicate, for example, with one or more human readable display devices, such as, an LCD panel, an LED display or other display device or printer. The memory component 190 may comprise any appropriate information storage device, including combinations of magnetic storage devices (e.g., magnetic tape, radio frequency tags, and hard disk drives), optical storage devices, computer readable media, and/or semiconductor memory devices such as Random Access Memory (RAM) devices and Read-Only Memory (ROM) devices. The memory component 190 may store the program 191 for controlling the processor 189. The processor 189 performs instructions of the program 191, and thereby operates in accordance with the present invention.

The memory component 190 may also store and send all or some of the information sent to the processor 189 in a plurality of modules 192, 193. As such, the module 192, 193 may each contain a look-up table, as discussed above. This can improve the logic and processing speed of the server 187 in analyzing cyber readiness of an organization, as well as reduce the required computing power by the server 187 to do so.

Communication device 188 may include an input device including any mechanism or combination of mechanisms that permit an operator to input information to communication device 188, such as a keyboard, a mouse, a touch sensitive display device, a microphone, a pen-based pointing device, a biometric input device, and/or a voice recognition device. Communication device 178 may include an output device that can include any mechanism or combination of mechanisms that outputs information to the operator, including a display, a printer, a speaker, etc.

From the foregoing description, one skilled in the art can readily ascertain the essential characteristics of the invention, and without departing from the spirit and scope thereof, can make changes and modifications of the invention to adapt it to various conditions and to utilize the present invention to its fullest extent. The specific embodiments described here are to be construed as merely illustrative, and not limiting of the scope of the invention in any way whatsoever. Moreover, features described in connection with one embodiment of the invention may be used in conjunction with other embodiments, even if not explicitly stated above.

We claim:

1. A method for evaluating cyber readiness of an organization, the method comprising:

presenting, by a computer, a plurality of objective questions to a user, wherein each of the objective questions has one or more predefined answers to be selected by said user;

receiving, by said computer, answers to said plurality of objective questions from said user;

correlating, by said computer, one or more of said objective questions to a plurality of elements of an organizational safeguard;

determining based on said answers, by said computer, a risk rating for a threat origin of a cyber-attack;

determining based on said answers, by said computer, a strength rating for said organizational safeguard against said threat origin, wherein said elements of said organizational safeguard collectively determine said strength rating of said organizational safeguard;

comparing, by said computer, said risk rating of said threat origin to said strength rating of said organizational safeguard;

determining based on said comparison, by said computer, a cyber readiness rating of said organizational safeguard from said cyber-attack by said threat origin; and presenting, by said computer, the cyber readiness rating of said organizational safeguard, wherein determining of said strength rating of said organizational safeguard comprises:

determining, by said computer, a strength rating for a first element of said organizational safeguard based on at least one of said answers, determining, by said computer, a strength rating for a second element of said organizational safeguard based on at least one of said answers, and determining, by said computer, a strength rating for a third element of said organizational safeguard based on said strength rating of said first element and said strength rating of said second element.

2. The method of claim 1, wherein presenting the cyber readiness rating of said organization comprises:

presenting, by said computer, said threat origin and said risk rating of said threat origin; and presenting, by said computer, said organizational safeguard and said strength rating of said organization safeguard.

3. The method of claim 2, additionally comprising:

identifying, by said computer, a relationship between said risk rating of said threat origin and said strength rating of said organizational safeguard.

4. The method of claim 3, wherein said cyber readiness rating of said organizational safeguard from said cyber-attack by said threat origin comprises one of a plurality of levels, the levels being severe gap, possible concern, and okay.

5. The method of claim 1, wherein said risk rating of said threat origin is determined independent from said strength rating of said organizational safeguard.

6. The method of claim 1, wherein determining said risk rating of said threat origin comprises:

determining based on said answers, by said computer, a plurality of threat vectors, wherein the threat vectors correspond to the threat origin; and determining based on said answers, by said computer, a risk rating for each of said threat vectors.

7. The method of claim 6, wherein determining said risk rating of said threat origin further comprises:

determining based on said risk rating for each of said threat vectors, by said computer, a cumulative risk rating of said threat origin.

8. The method of claim 1 wherein determining said strength rating of said organizational safeguard additionally comprises:

determining, by said computer, a strength rating for a fourth element of said organizational safeguard based on at least one of said answers; and determining, by said computer, a strength rating for a fifth element of said organizational safeguard based on said strength rating of said third element and said strength rating of said fourth element.

9. The method of claim 8, wherein said strength rating for said first element, said strength rating for said second element, said strength rating for said third element, said strength rating for said fourth element, and said strength rating for said fifth element are each determined using a look-up table.

10. The method of claim 9, wherein the look-up table provides an outcome for each possible combination of answers to said objective question.

11. The method of claim 1, additionally comprising:

determining based on said objective questions, by said computer, an inherent risk profile, wherein the inherent risk profile comprises a plurality of threat origins and a risk rating for each of the threat origins.

12. The method of claim 1, additionally comprising:

determining based on said objective questions, by said computer, a preparedness profile, wherein said preparedness profile comprises a plurality of organizational safeguards and a strength rating for each of said organizational safeguards.

13. The method of claim 1, wherein:

said strength rating of said first element is determined using a first look-up table, said strength rating of said second element is determined using a second look-up table, and said strength rating of said third element is determined using a third look-up table, and said third look-up table comprises each possible combination of outcomes from said first and second look-up tables.

14. A system for evaluating cyber readiness of an organization, the system comprising:

a memory storage device; and a processor in communication with said memory storage device and configured to:

present a plurality of objective questions to a user, wherein each of the objective questions has one or more predefined answers to be selected by said user;

receive answers to said plurality of objective questions from said user;

correlate one or more of said objective questions to a plurality of elements of an organizational safeguard;

determine based on said answers a risk rating for a threat origin of a cyber-attack;

determine based on said answers a strength rating for said organizational safeguard against said threat origin, wherein said elements of said organizational safeguard collectively determine said strength rating of said organizational safeguard;

compare said risk rating of said threat origin to said strength rating of said organizational safeguard;

determine based on said comparison the cyber readiness rating of said organizational safeguard from said cyber-attack by said threat origin; and present the cyber readiness rating of said organizational safeguard, wherein determining of said strength rating of said organizational safeguard comprises:

determining a strength rating for a first element of said organizational safeguard based on at least one of said answers, determining a strength rating for a second element of said organizational safeguard based on at least one of said answers, and determining a strength rating for a third element of said organizational safeguard based on said strength rating of said first element and said strength rating of said second element.

15. The system of claim 14, wherein presenting the cyber readiness rating of said organization comprises:

presenting said threat origin and said risk rating of said threat origin; and presenting said organizational safeguard and said strength rating of said organization safeguard.

16. The system of claim 15, additionally comprising:

identifying a relationship between said risk rating of said threat origin and said strength rating of said organizational safeguard.

17. The system of claim 16, wherein said cyber readiness rating of said organizational safeguard from said cyber-attack by said threat origin comprises one of a plurality of levels, the levels being severe gap, possible concern, and okay.

18. The system of claim 14, wherein determining said risk rating of said threat origin comprises:

determining based on said answers a plurality of threat vectors, wherein the threat vectors correspond to the threat origin; and determining based on said answers a risk rating for each of said threat vectors.

19. The system of claim 18, wherein determining said risk rating of said threat origin to cyber-attack further comprises:

determining based on said risk rating for each of said threat vectors a cumulative risk rating for said threat origin.

20. The system of claim 14, wherein determining of said strength rating of said organizational safeguard additionally comprises:

determining a strength rating for a fourth element of said organizational safeguard based on at least one of said answers; and determining a strength rating for a fifth element of said organizational safeguard based on said strength rating of said third element and said strength rating of said fourth element.

21. The system of claim 20, said strength rating for said first element, said strength rating for said second element, said strength rating for said third element, said strength rating for said fourth element, and said strength rating for said fifth element are each determined using a look-up table.

22. The system of claim 21, wherein the look-up table provides an outcome for each possible combination of answers to said objective questions.

23. The system of claim 14, wherein the processor is additionally configured to:

determine based on said objective questions an inherent risk profile, wherein the inherent risk profile comprises a plurality of threat origins and a risk rating for each of the threat origins.

24. The system of claim 14, wherein the processor is additionally configured to:

determine based on said objective questions a preparedness profile, wherein said preparedness profile comprises a plurality of organizational safeguards and a strength rating for each of said organizational safeguards.

25. The system of claim 14, wherein:

said strength rating of said first element is determined using a first look-up table, said strength rating of said second element is determined using a second look-up table, and said strength rating of said third element is determined using a third look-up table, and said third look-up table comprises each possible combination of outcomes from said first and second look-up tables.

26. A non-transitory computer-readable medium tangibly storing computer program instructions which when executed by a processor, causes the processor to:

present a plurality of objective questions to a user, wherein each of the objective questions has one or more pre-defined answers to be selected by said user;

receive answers to said plurality of objective questions from said user;

correlate one or more of said objective questions to a plurality of elements of an organizational safeguard;

determine based on said answers a risk rating for a threat origin of a cyber-attack;

determine based on said answers a strength rating for said organizational safeguard against said threat origin, wherein said elements of said organizational safeguard collectively determine said strength rating of said organizational safeguard;

compare the risk rating of said threat origin to said strength rating of said organizational safeguard;

determine based on said comparison a cyber readiness rating of said organizational safeguard from said cyber-attack by said threat origin; and present the cyber readiness rating of the organizational safeguard, wherein determining of said strength rating of said organizational safeguard comprises:

determining a strength rating for a first element of said organizational safeguard based on at least one of said answers, determining a strength rating for a second element of said organizational safeguard based on at least one of said answers, and determining a strength rating for a third element of said organizational safeguard based on said strength rating of said first element and said strength rating of said second element.

27. The non-transitory computer-readable medium of claim 26, wherein:

said strength rating of said first element is determined using a first look-up table, said strength rating of said second element is determined using a second look-up table, and said strength rating of said third element is determined using a third look-up table, and said third look-up table comprises each possible combination of outcomes from said first and second look-up tables.

* * * * *